(12) United States Patent
Noda et al.

(10) Patent No.: US 9,469,035 B2
(45) Date of Patent: Oct. 18, 2016

(54) COMPONENT SUPPLY APPARATUS

(75) Inventors: Akio Noda, Tokyo (JP); Tatsuya Nagatani, Tokyo (JP); Yukiyasu Domae, Toyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/125,712

(22) PCT Filed: Jun. 20, 2012

(86) PCT No.: PCT/JP2012/065766
§ 371 (c)(1),
(2), (4) Date: Dec. 12, 2013

(87) PCT Pub. No.: WO2013/002099
PCT Pub. Date: Jan. 3, 2013

(65) Prior Publication Data
US 2014/0147240 A1    May 29, 2014

(30) Foreign Application Priority Data
Jun. 29, 2011 (JP) ................. 2011-144073

(51) Int. Cl.
*B25J 13/00* (2006.01)
*B25J 13/08* (2006.01)
(Continued)

(52) U.S. Cl.
CPC .............. *B25J 13/08* (2013.01); *B25J 9/0018* (2013.01); *B25J 9/0084* (2013.01); *B25J 9/1697* (2013.01); *B25J 19/021* (2013.01); *G05B 2219/40012* (2013.01)

(58) Field of Classification Search
CPC ............................... B25J 13/08; B25J 9/0018

USPC ................... 414/225.01, 226.01, 787, 751.1; 700/245, 247, 248, 259; 901/2, 8, 47
See application file for complete search history.

(56) References Cited

U.S. PATENT DOCUMENTS

| 4,011,437 A * | 3/1977 | Hohn ..................... B25J 9/0093 |
| | | 318/568.11 |
| 4,402,053 A | 8/1983 | Kelley et al. |

(Continued)

FOREIGN PATENT DOCUMENTS

| DE | 10 2008 052 436 A1 | 4/2010 |
| JP | 6 127698 | 5/1994 |

(Continued)

OTHER PUBLICATIONS

International Search Report Issued Sep. 18, 2012 in PCT/JP12/065766 Filed Jun. 20, 2012.

(Continued)

*Primary Examiner* — Paul T Chin
(74) *Attorney, Agent, or Firm* — Oblon, McClelland, Maier & Neustadt, L.L.P

(57) ABSTRACT

A component supply apparatus capable of aligning components of various shapes, which are supplied in bulk, within a short period of time with general means. The apparatus includes a three-dimensional vision sensor measuring a depth map, a bulk component box, a robot picking up a component from the bulk component box, a temporary placing table onto which components are rolled, a two-dimensional vision sensor measuring a profile of the components, a robot group picking up the component rolled on the temporary placing table, and changing a position and orientation of the component into a position and orientation that involve an error of a certain level or less with respect to a position and orientation that are specified in advance, while changing the position and orientation of the component, and a control device controlling those portions.

8 Claims, 17 Drawing Sheets

(51) Int. Cl.
*B25J 9/00* (2006.01)
*B25J 9/16* (2006.01)
*B25J 19/02* (2006.01)

(56) References Cited

U.S. PATENT DOCUMENTS

| | | | |
|---|---|---|---|
| 2003/0017032 A1* | 1/2003 | Olesen et al. | 414/226.01 |
| 2004/0186624 A1* | 9/2004 | Oda et al. | 700/245 |
| 2008/0082213 A1 | 4/2008 | Ban et al. | |
| 2009/0116940 A1* | 5/2009 | Burke et al. | 414/225.01 |
| 2011/0222995 A1* | 9/2011 | Irie et al. | 414/225.01 |
| 2012/0158180 A1* | 6/2012 | Iio et al. | 700/259 |
| 2012/0197438 A1* | 8/2012 | Ogami | 700/258 |
| 2012/0209415 A1* | 8/2012 | Casanelles | B25J 9/0084 700/109 |
| 2013/0073090 A1* | 3/2013 | Ichimaru | 700/259 |
| 2013/0211593 A1 | 8/2013 | Domae et al. | |
| 2013/0245828 A1* | 9/2013 | Tateno et al. | 700/259 |
| 2014/0067127 A1* | 3/2014 | Gotou | 700/259 |
| 2014/0100696 A1* | 4/2014 | Kim et al. | 700/259 |
| 2014/0121836 A1* | 5/2014 | Ban | 700/259 |
| 2014/0229005 A1* | 8/2014 | Suzuki | 700/254 |

FOREIGN PATENT DOCUMENTS

| | | |
|---|---|---|
| JP | 8 112788 | 5/1996 |
| JP | 9 239682 | 9/1997 |
| JP | 2004 230513 | 8/2004 |
| JP | 2005-335010 | 12/2005 |
| JP | 2006 35346 | 2/2006 |
| JP | 2007 245283 | 9/2007 |
| JP | 2008 87074 | 4/2008 |
| JP | 2008 178930 | 8/2008 |
| JP | 2010 89238 | 4/2010 |
| JP | 2010 105105 | 5/2010 |
| JP | 2010 120141 | 6/2010 |
| JP | 2011 669 | 1/2011 |
| JP | 2011 685 | 1/2011 |
| JP | 2011 93058 | 5/2011 |
| JP | 2011 183537 | 9/2011 |
| JP | 2012 245602 | 12/2012 |
| JP | 2013 52460 | 3/2013 |
| JP | 2013-52490 A | 3/2013 |

OTHER PUBLICATIONS

Office Action issued Mar. 31, 2015 in German Patent Application No. 11 2012 002 677.2 (with English translation).

Office Action issued Jun. 9, 2015 to Korean Patent Application No. 10-2014-7002263, with English translation.

* cited by examiner

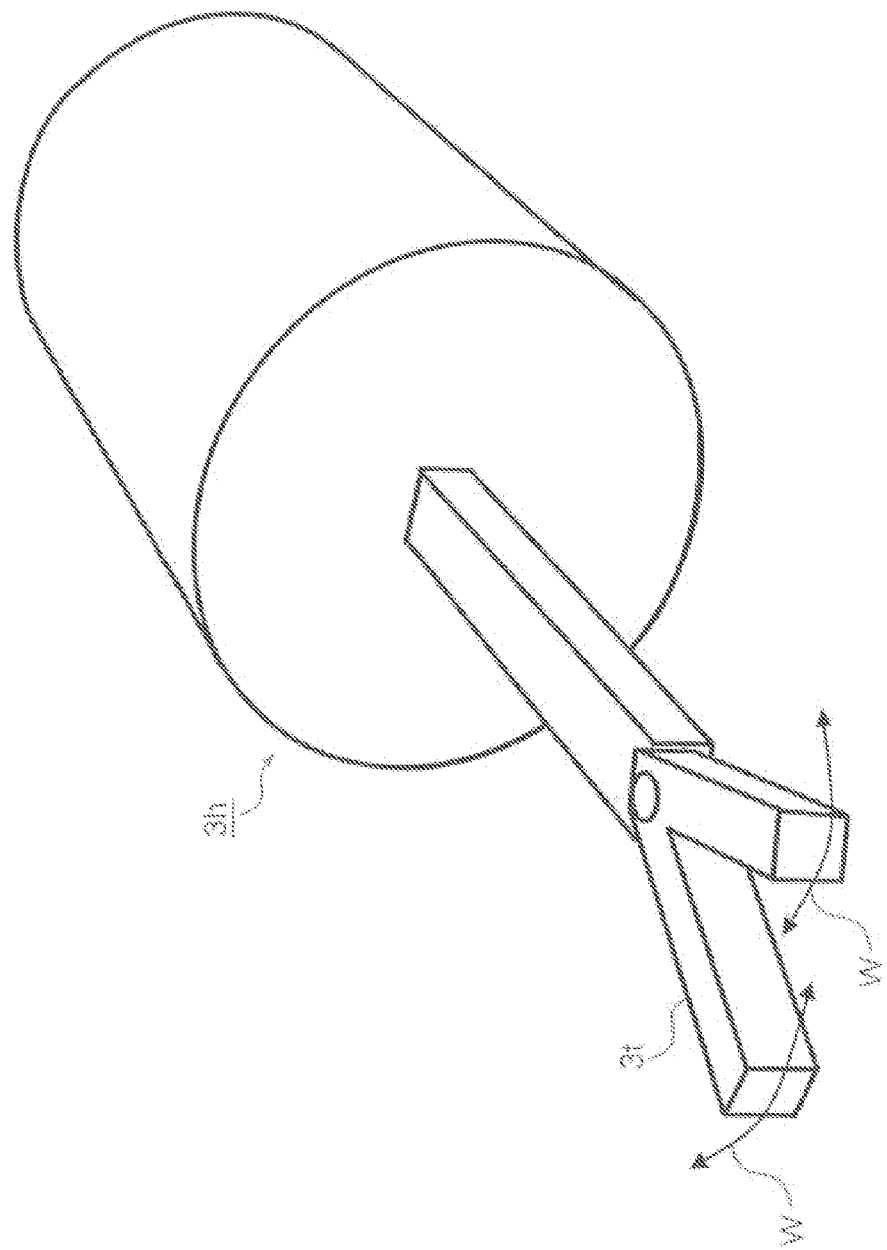

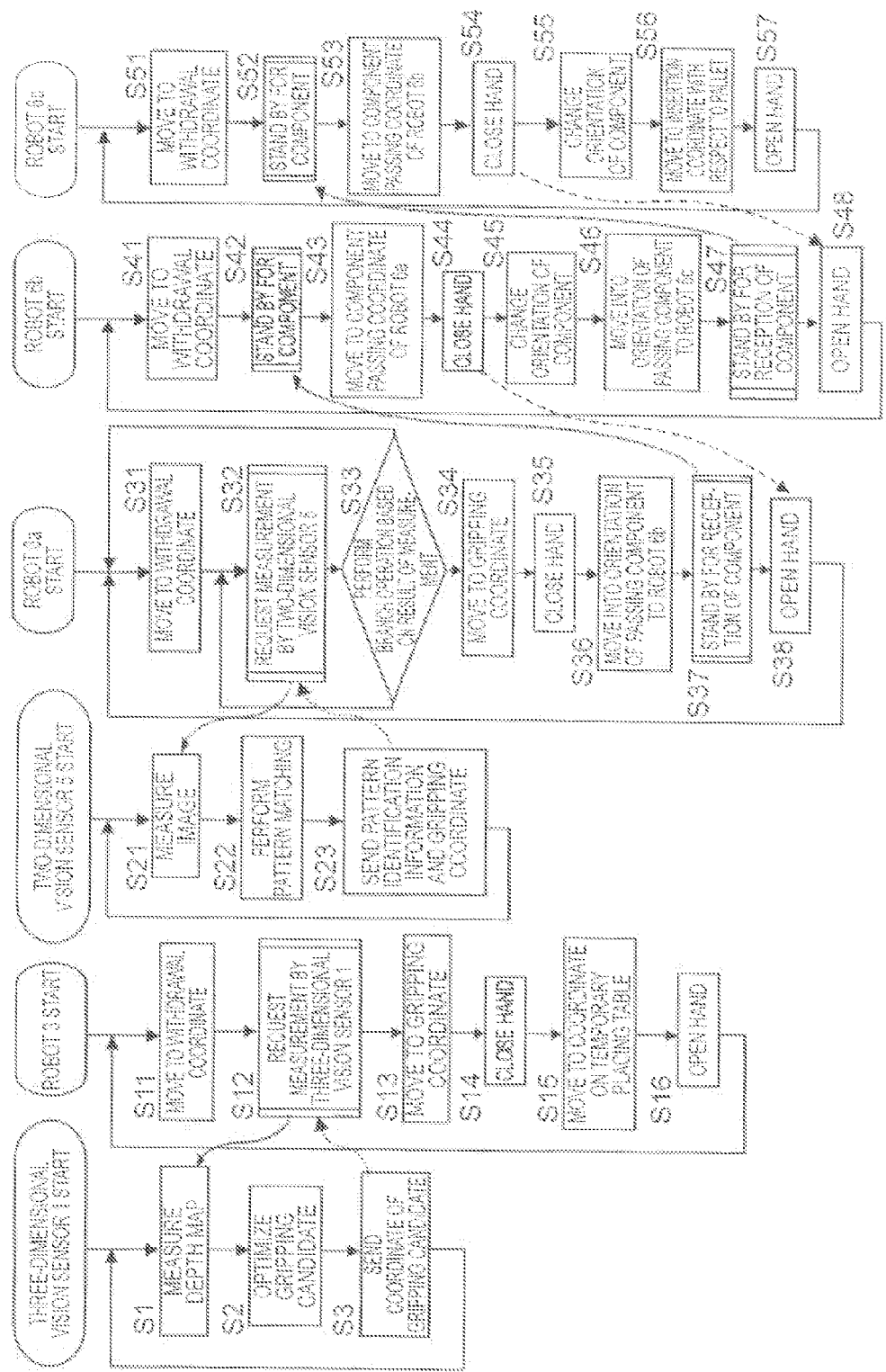

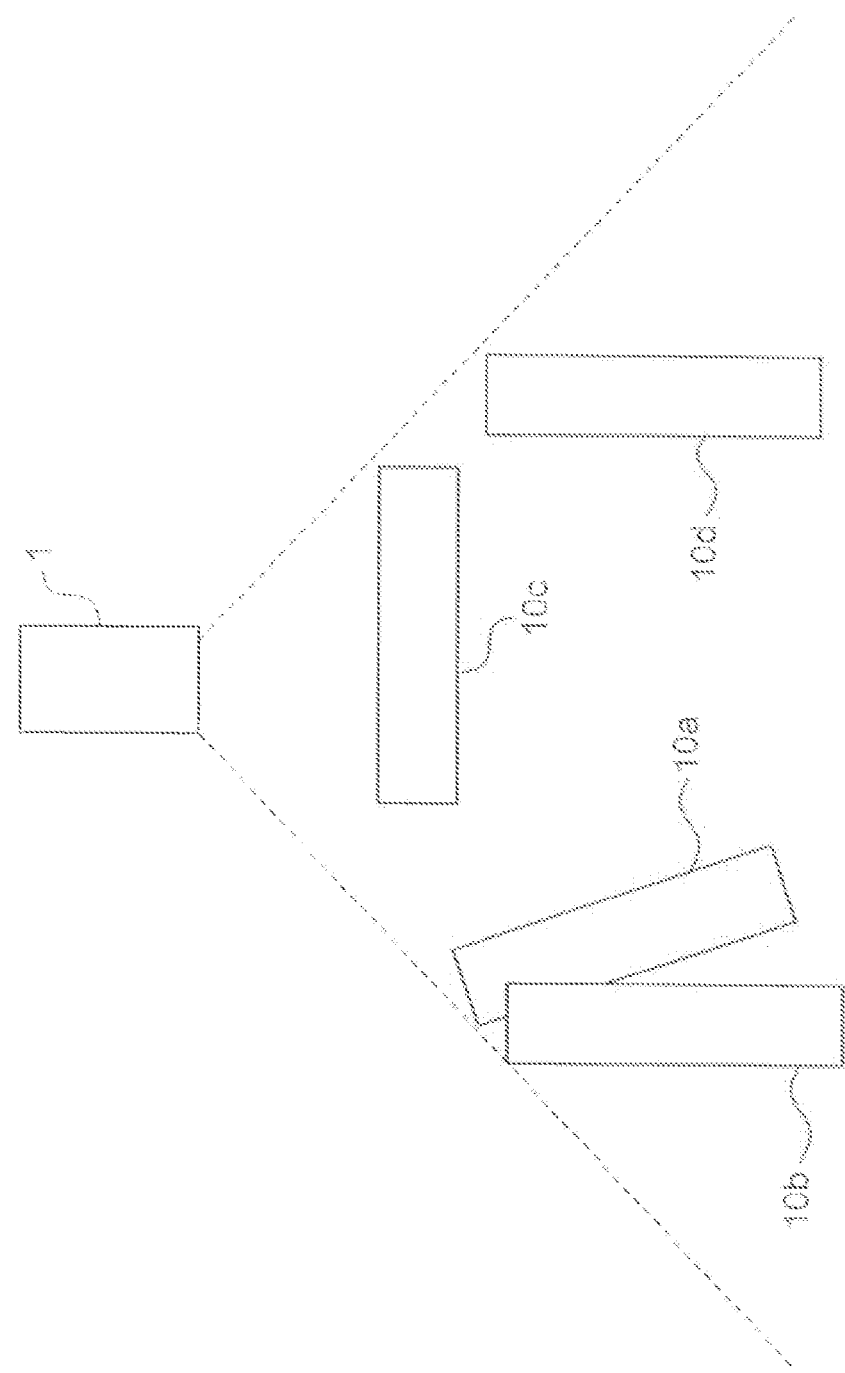

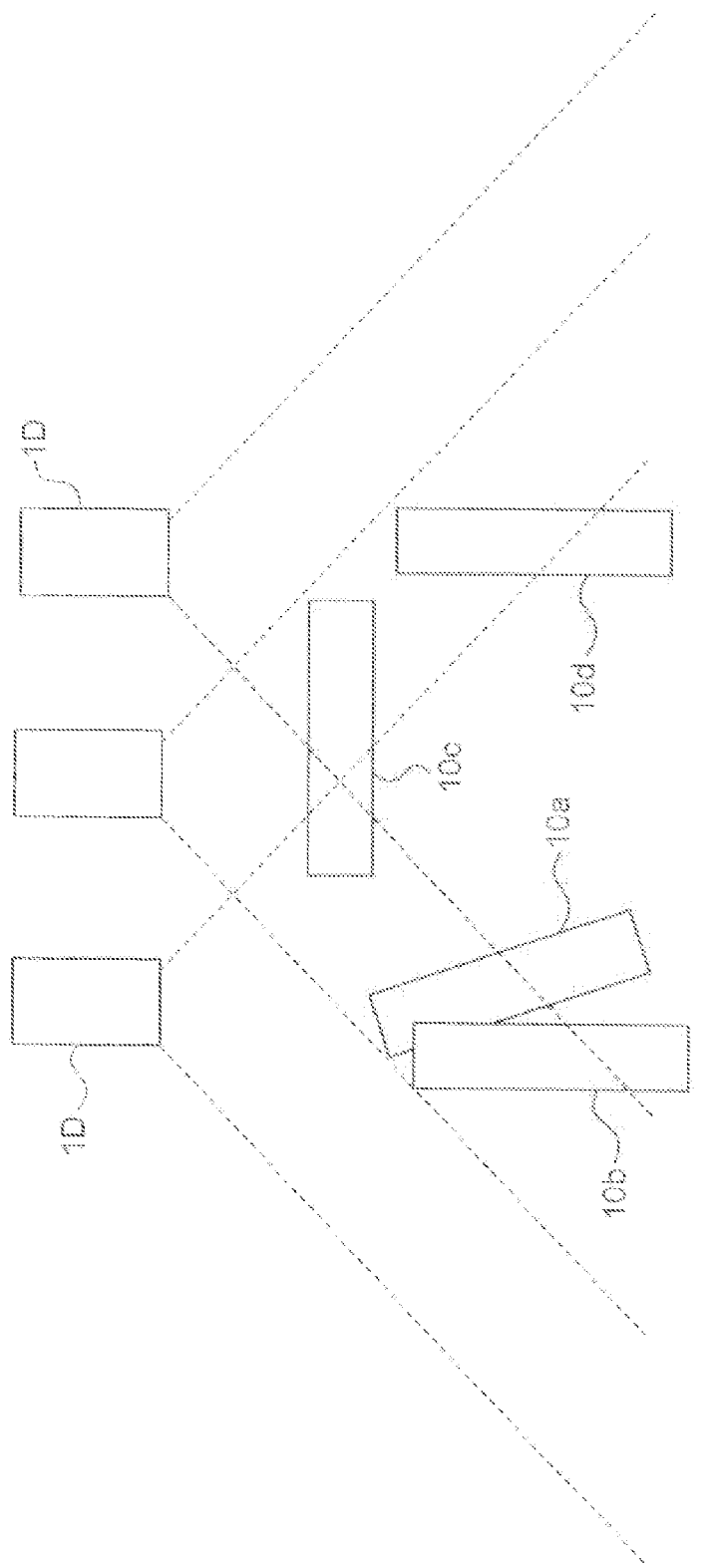

ns are supplied as objects, a larger number of components need to be supplied in advance. Thus, there arises a problem in that much stock needs to be kept on hand, and a space volume (floor space and height) in a factory is wasted.

COMPONENT SUPPLY APPARATUS

TECHNICAL FIELD

The present invention relates to a component supply apparatus for aligning components supplied in bulk, for example, with respect to an automated assembly apparatus and an automated assembly robot, and more particularly, to a component supply apparatus for aligning components with use of a plurality of vertical articulated robots (hereinafter also simply referred to as "robots").

BACKGROUND ART

Generally, on a product assembly line, in order to reduce the number of vehicles required at the time of conveying and stocking the components, or to save spaces to be occupied by boxes of the components, components conveyed from a supplier or a preceding step are delivered in what is called a bulk package in many cases.

Thus, in order to promote automation of product assembly, positions and orientations of components to be supplied to an assembly apparatus need to be aligned with some means.

Hitherto, as means for automatically aligning bulk components, there has been widely used dedicated component alignment devices called parts feeders. However, the parts feeders are exclusively designed in accordance with types of the components, and hence have no versatility. Thus, there are problems of requiring a long design time, being expensive, generating vibration and noise during an operation, and occupying a large proportion of a floor space in a factory.

Further, when the components have complicated shapes, there is another problem in that the components are entangled in the parts feeder, and temporary operation stoppages called work interruptions may occur. As a result, calls to maintenance personnel may be more frequently made.

Still further, depending on shapes, the components may not be aligned by the parts feeder. Thus, in such a case, the parts feeder itself cannot be used.

Under the circumstances, as an automated method that can be used instead of the parts feeder, there has been known a technology of correcting positions and orientations as follows. The bulk components are brought into a state in which the components are not overlapped with each other to some extent with some hardware mechanism, and then only components in preferred orientations are recognized with a vision sensor (for example, refer to Patent Literature 1).

In addition, there has been known a technology of recognizing positions and orientations of the bulk components, changing an orientation of a picked-up component when necessary and temporarily placing the picked-up component, and re-changing, when necessary, the orientation of the picked-up component to align the picked-up component (for example, refer to Patent Literature 2).

The technology described in Patent Literature 1 depends on a probabilistic phenomenon in which only components in preferred orientations are selected and handled from among a sufficient number of components supplied in advance. Thus, a proportion of the components in preferred orientations becomes lower along with a decrease in number of the components. As a result, there arises a problem in that calls to maintenance personnel are more frequently made irrespective of a state in which a certain number of components are left.

Further, when components that are less likely to have preferred orientations are supplied as objects, a larger number of components need to be supplied in advance. Thus, there arises a problem in that much stock needs to be kept on hand, and a space volume (floor space and height) in a factory is wasted.

Meanwhile, the technology described in Patent Literature 2 is devised for cubic components against which a suction pad can be accurately brought into abutment without involving air leakage and which can be sucked in an intended way. Thus, there arises a problem in that the technology described in Patent Literature 2 cannot be adapted to components that are not provided with parts to which the suction pad is ineffective or that cannot be sucked by the suction pad, such as a component having a planar shape, a component having a complicated shape, a component having surfaces with projections and recesses, a porous component, and a component having a narrow shape.

Note that, when the suction pad cannot be used, suction with a blower may be performed. However, in this case, there are problems of loud noise and high electric power consumption.

In addition, in each of the cases of Patent Literatures 1 and 2, hands that are specially designed in accordance with types of the components are used to absorb significant errors that may cause failures in final alignment. Thus, components of a plurality of types cannot be aligned with a hand of a single type, and hence it is necessary to prepare hands as many as the types of the components. As a result, there arises a problem in that time periods for switching the hands and a large space for temporarily placing the hands are required.

Further, the hands need to be re-designed in accordance with the types of the components, and hence there arises a problem in that, at the time of changeover of production equipment, costs for re-designing the hands (design cost, production cost, and adjustment cost) are required.

CITATION LIST

Patent Literature

[PTL 1] JP 6-127698 A
[PTL 2] JP 2011-685 A

SUMMARY OF INVENTION

Technical Problems

With regard to the conventional component supply apparatus, the technology of Patent Literature 1 depends on the probabilistic phenomenon. Thus, there is a problem in that much stock needs to be kept on hand due to a large number of put-in components, and a space volume in a factory is wasted.

Further, the technology of Patent Literature 2 has a problem of being inapplicable to components that are not provided with parts against which a suction pad cannot be brought into abutment.

Further, in those conventional component supply apparatus, the hands that are specially designed in accordance with types of components are used, and hence have a problem in that significantly high costs, time periods for switching the hands, and a space for temporarily placing the hands are required.

The present invention has been made to solve the problems as described above, and it is therefore an object of the present invention to provide a component supply apparatus capable of aligning bulk components by handling the component with use of vision sensors and a plurality of robots each including a parallel chuck hand, without jigs or hands that are exclusively designed in accordance with various types of components.

Solution to Problems

A component supply apparatus according to the present invention includes: a bulk component box for receiving bulk components; depth map measuring means for measuring a depth map of the bulk components in the bulk component box; isolation means for picking up a component from the bulk component box based on the depth map; and position and orientation changing means for changing a position and orientation of the component isolated by the isolation means into a position and orientation that involve an error of a certain level or less with respect to a final position and orientation that are specified in advance.

Advantageous Effects of Invention

According to the present invention, after the position and orientation of the component are recognized by a vision sensor, the component is handled through a pipeline process while being transferred between a plurality of robots. Thus, bulk components can be aligned within a short period of time.

Further, even when the components have complicated shapes, elongation of a cycle time of the alignment process can be avoided. Still further, switching in accordance with production models can be rapidly performed only by changing software, and hence dedicated hands for the components need not be respectively prepared. As a result, it is possible to reduce costs of the hands, save time periods for designing the hands, and save a temporary placing space for the hands.

BRIEF DESCRIPTION OF DRAWINGS

FIG. 4 is a specific perspective view of another configuration example of the hand of the robot in FIG. 1.

FIG. 5 is a flowchart illustrating an overall operational sequence according to the first embodiment of the present invention.

FIG. 17 are explanatory views represented by side views of bulk components, which illustrate the problem to be solved by the ninth embodiment of the present invention.

FIG. 18 are side views of a plurality of three-dimensional vision sensors according to the ninth embodiment of the present invention.

DESCRIPTION OF EMBODIMENTS

First Embodiment

In the following, description is made of a first embodiment of the present invention with reference to FIGS. 1 to 5.

Figure 1:
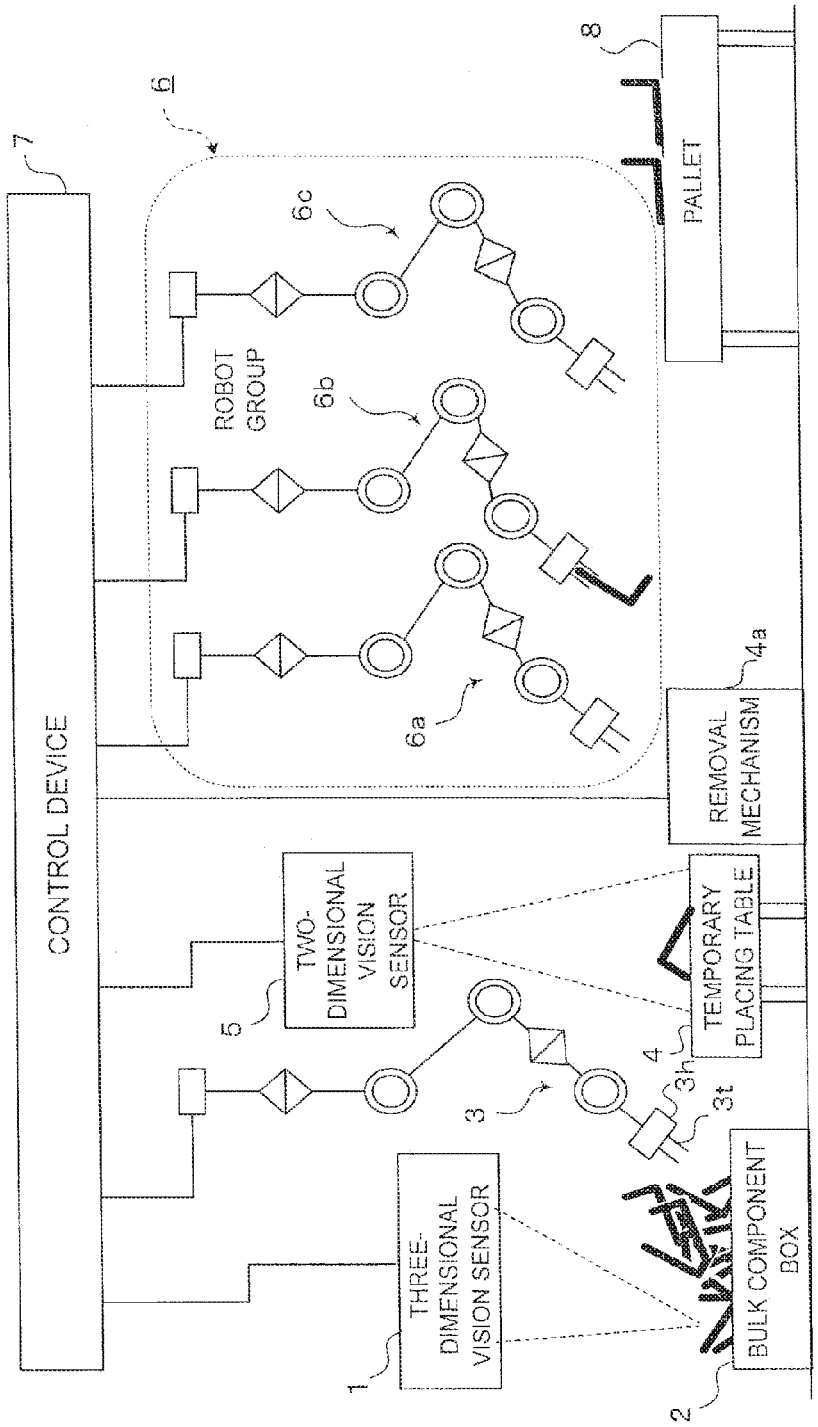
FIG. 1 is a schematic side view of an overall structure of a component supply apparatus according to a first embodiment of the present invention.

FIG. 1 is a schematic side view of an overall structure of a component supply apparatus according to the first embodiment of the present invention. Specifically, a plurality of (four) robots 3, 6a, 6b, and 6c are used to illustrate a structure for supplying bulk components in alignment.

In FIG. 1, the component supply apparatus includes a three-dimensional vision sensor 1, a bulk component box 2 for receiving a large number of components (for example, L-shaped components), the first robot 3 (hereinafter also simply referred to as "robot 3") arranged close to the bulk component box 2, a temporary placing table 4 for the components, a two-dimensional vision sensor 5 for imaging the temporary placing table 4, a robot group 6 (second robot) including the robots 6a to 6c, a control device 7 for controlling the robot 3 and the robot group 6 based on detection results from the three-dimensional vision sensor 1 and the two-dimensional vision sensor 5, and a pallet 8 for placing thereon the aligned components.

The three-dimensional vision sensor 1 functions as depth map measuring means together with the control device 7, specifically, has a function to image, mainly from above, the components stacked up in the bulk component box 2, and to measure, from the three-dimensional vision sensor 1, a large number of data items of depth to an upper surface of the components arrayed at different heights (at random).

Note that, as a principle of measurement for obtaining the depth data items from the three-dimensional vision sensor 1, there are applicable well-known methods such as a stereo method, a light-section method, a spatial coding method, a random coding method, and a time of flight method. The two broken lines extending from the three-dimensional vision sensor 1 illustrate a state in which depth triangulation is performed according to those methods.

The depth data items obtained by the three-dimensional vision sensor 1 are subjected, for example, to a coordinate conversion calculation in the three-dimensional vision sensor 1 or the control device 7. With this, the depth map can be calculated.

The depth map is obtained by performing "mapping of coordinate values in a direction of a specific coordinate axis" as viewed in a certain coordinate system with respect to pixels of an image of an imaged scene, such as a map of heights of the stacked-up components as viewed in a base coordinate system of the robot 3.

Figure 2:
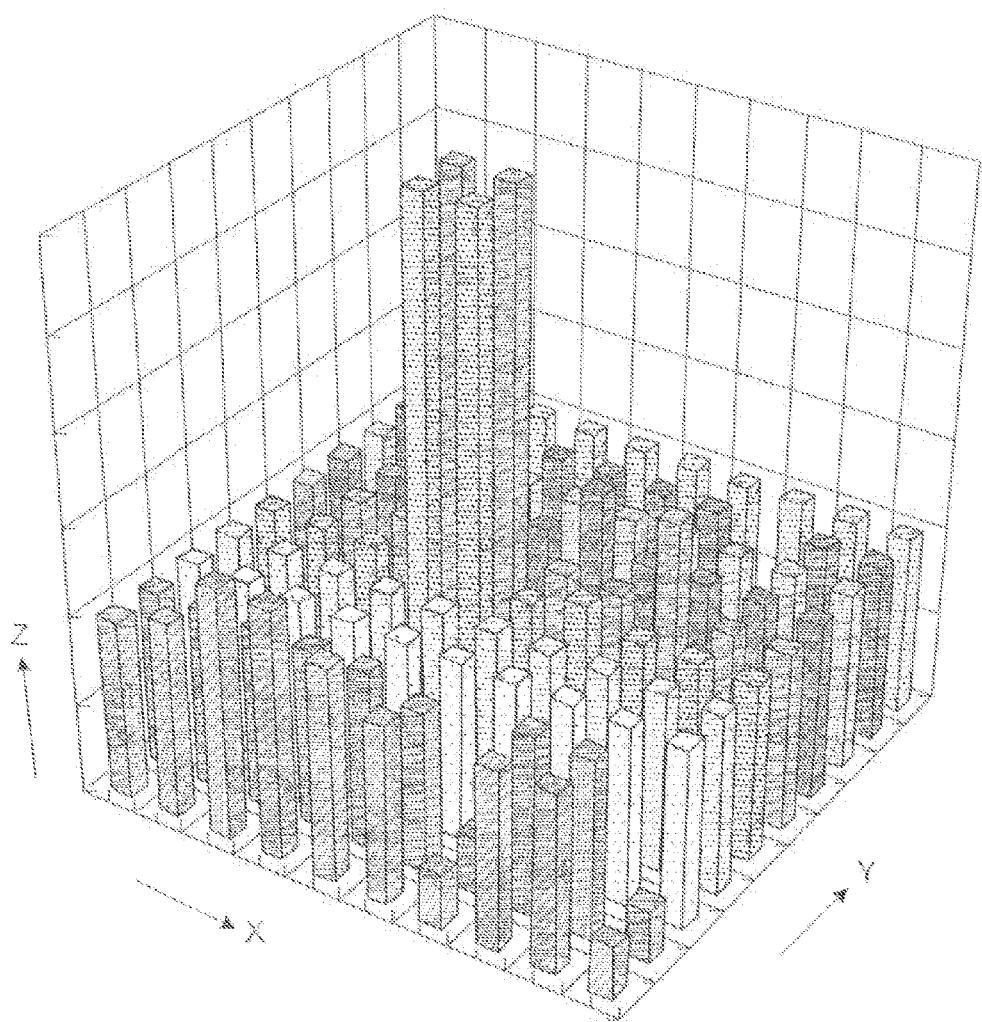
FIG. 2 is an explanatory view of a specific example of a depth map used in the first embodiment of the present invention.

FIG. 2 is an explanatory view of a specific example of the depth map, which illustrates a state in which a height (depth) distribution in a group of the components bulked up over an upper portion of the bulk component box 2 is plotted in the X-Y plane of a robot coordinate system, and measurement values of positions of the highest ones of Z coordinates are mapped.

In FIG. 2, magnitudes of the values of the Z coordinates are represented by the lengths of bars in a bar graph, and the entire graph is plotted. In FIG. 2, parts extending in a protruding manner near the center are assumed to represent a state in which some of the components stick up. Similarly, projecting portions adjacent to recessed parts on a front side are assumed to represent presence of protruding parts (grippable parts) of the components.

The bulk component box 2 is a simple box having no special function and opened on an upper side, and basically, has a size sufficient for storing components by what is called an on-hand amount or a stock amount.

Note that, the bulk component box 2 may have a partitioned configuration in which an inside thereof is partitioned to enable storing of components of a plurality of types. In this case, sizes of compartments formed by the partition need not be uniform.

Further, in order to enhance shock resistance, a cushioning member such as a sponge may be provided on an inner bottom surface or an outer bottom surface of the bulk component box 2, or the bulk component box 2 may be supported with a spring member.

Still further, a structure such as a plate-like protrusion may be provided on an inside of the bulk component box 2 so that the orientations of the components are likely to be aligned in a specific range.

Yet further, the bulk component box 2 may be replaced with use of a pallet changer, a belt conveyor, and the like so that the components are constantly left therein.

The robot 3 and the robot group 6 include generally prevalent vertical articulated robots.

The robot 3 functions as isolation means (described below) together with the three-dimensional vision sensor 1, the temporary placing table 4, and the control device 7, and includes a hand 3h having tweezers-like or forcipate thin claws 3t.

Meanwhile, the robot group 6 functions as position and orientation changing means for the components together with the two-dimensional vision sensor 5 and the control device 7. The robots 6a to 6c in the robot group 6 each include a parallel chuck hand.

Next, description is made of a schematic operation according to the first embodiment of the present invention, which is illustrated in FIG. 1.

First, the three-dimensional vision sensor 1 analyzes a depth map, and calculates candidate parts (hereinafter also simply referred to as "candidates") that can be gripped by the robot 3 from among the components stacked up in the bulk component box 2. Then, through optimization, the grippable candidate parts are targeted to one.

Note that, prior to the arithmetic process on the grippable candidates, shapes and sizes of the claws 3t of the hand 3h of the robot 3 are digitized in advance.

Figure 3:
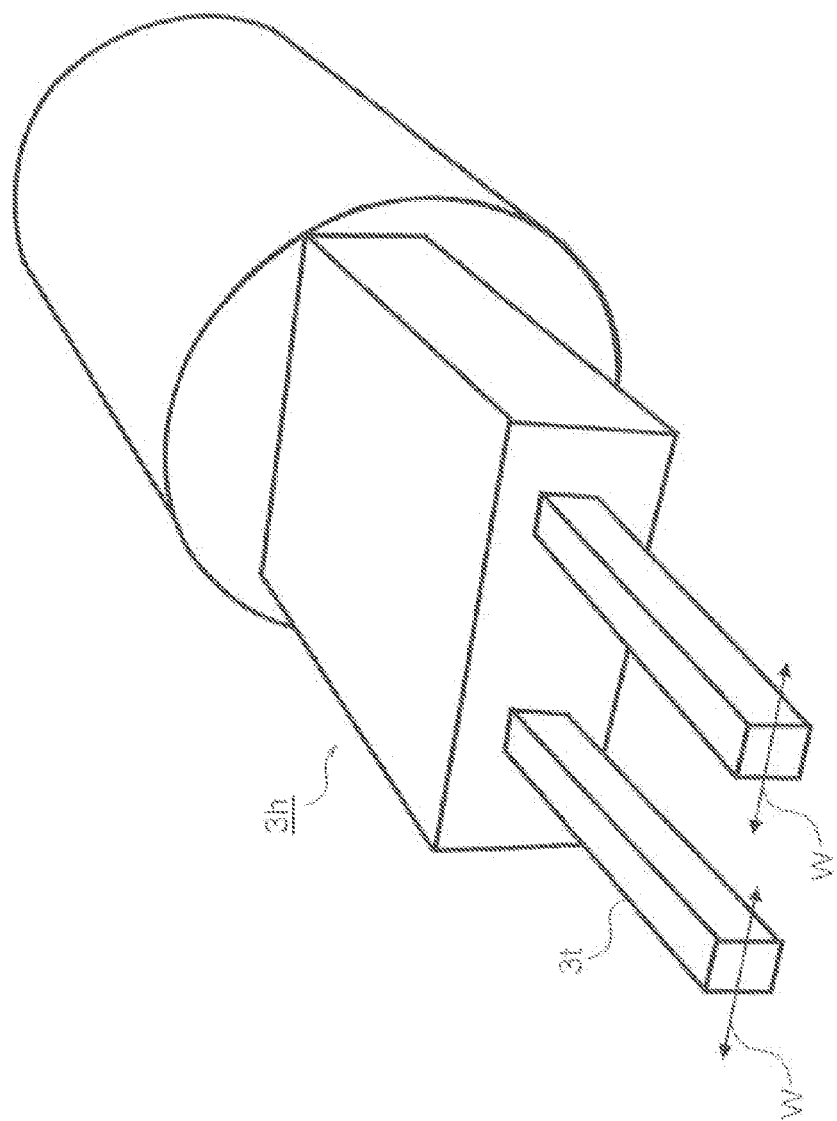
FIG. 3 is a specific perspective view of a configuration example of a hand of a robot in FIG. 1.

For example, when the hand 3h has a shape as illustrated in FIG. 3 or 4, the claws 3t are numerically modeled in advance as two columnar cylinders or square columns of a minimum size containing the respective claws 3t opened at an opening width W. With this, distal end portions of the two claws 3t of the hand 3h can be inserted into a heap of the bulk components simultaneously with each other without coming into contact with the components.

In this case, a diameter of the columnar cylinders or a diagonal of the square columns approximates a diagonal of the claws 3t, and a length of the columnar cylinders or the square columns approximates a depth of a part of each of the claws 3t, which is applied to a component for gripping.

Next, on a premise that a latest depth map is obtained, the three-dimensional vision sensor 1 searches the latest depth map for a location having spaces that may accommodate the columnar cylinders or the square cylinders obtained through the numerical modeling in advance, and having a component present between the spaces.

In the case of FIG. 2, two points, specifically, the part extending in a protruding manner near the center in FIG. 2 and the part adjacent to the recessed parts on the front side in FIG. 2 are found.

Alternatively, template matching of shapes of small protruding parts that can be gripped by the hand 3h of the robot 3 (such as a square column, a columnar cylinder, a flat plate, and a disk that can be accommodated between the opened claws 3t of the hand 3h) is performed with respect to the depth map so as to search for and extract a plurality of candidates.

Next, the three-dimensional vision sensor 1 performs an optimization calculation in which scores are given to the plurality of extracted candidates and only one with the highest score is selected.

The score to be employed in this optimization calculation method in the highest Z-axis value of the protrusion sandwiched between the two columnar cylinders (or the fine square column thus found), and a candidate having the highest score is selected.

This optimization calculation corresponds to selection of the uppermost one of the bulk components. In other words, the optimization of the candidates of the components is performed through selection of the highest score.

In the case of FIG. 2, the central part in FIG. 2, at which the protrusions are present, corresponds to the optimized candidate.

Subsequently, how to apply the claws 3t of the hand 3h of the robot 3 so as to approach and grip the selected optimized candidate can be obtained through a simple calculation.

Specifically, how to apply the claws 3t can be calculated by converting a position and orientation of the robot 3 at the time of being capable of gripping the component to X-, Y-, and Z-axis values and rotation angles about those axes of the robot coordinate system, and adding thereto a position and orientation relative to a position and orientation of a grippable candidate.

Note that, the template matching of fine square columnar parts of sizes sufficient for being gripped by the hand 3h may be performed with respect to the depth map so as to extract a candidate point and perform optimization with use of a Z-axis height of the candidate point. Also in this way, a gripping position and orientation can be calculated, and hence the same advantage can be obtained.

After that, the robot 3 grips and carries the component to the temporary placing table 4, and releases the component above the temporary placing table 4.

At this time, it is desired that the component be placed onto the temporary placing table 4 by the robot 3 not gently but in a manner of being thrown onto the temporary placing table 4. In this way, entangled components are disentangled, and more likely to roll onto and rest on the temporary placing table 4 under a state of being separated from each other one by one.

Here, description is made of an operation in which the robot 3 is brought close to the components in the bulk component box 2 so as to pick up a component in a tool coordinate system of the robot 3, which corresponds to a right-handed system formed of the X-, the Y-, and the Z-axes, in which an A-, a B-, and a C-axes are defined respectively about the X-, the Y-, and the Z-axes, and in which a tool advances in a direction of the Z-axis.

For example, the claws 3t of the hand 3h of the robot 3 advance in the Z-axis direction in an orientation in which an A-axis value and a B-axis value of the tool coordinate system are maintained to be equal to each other, and in which the claws 3t are turned about the C-axis so as to enter gaps among the components.

At this time, there is used a region in which, of the calibration error between a coordinate system of the three-dimensional vision sensor 1 and the coordinate system of the robot 3, the orientation error is small. As a result, an isolation success probability P can be increased. For example, the robot 3 is operated to vertically lower the hand 3h. In other words, the Z-axis of the tool coordinate system is set to match a vertically downward direction of a world coordinate system or a direction of gravitational acceleration.

Note that, the "isolation" refers to picking up only one of the components in the bulk component box 2.

The temporary placing table 4 is a simple table provided with nothing. However, there may be additionally provided a mechanism 4a for sliding off an object-to-be-removed (foreign object) by its own weight, for example, by inverting a table surface (or forcing the foreign object out) when the foreign object is placed on the table.

When the removal mechanism 4a is provided to the temporary placing table 4, there is an advantage that error recovery is rapidly performed to suppress an increase in tact time.

Note that, a height of an upper surface of a top plate of the temporary placing table 4 (Z-axis direction of the robot coordinate system) is measured and stored in advance in a storage area of the control device 7.

Based on the robot coordinate calculation process, the robot 3 opens the claws 3t of the hand 3h with respect to the components bulked up in the bulk component box 2. In this state, the robot 3 moves the hand 3h to a gripping position that has been obtained at that time point, and closes the hand 3h.

Next, the robot 3 moves the hand 3h in a raising manner along the Z-axis direction of the robot coordinate system so as to perform an operation of drawing up, from the bulk component box 2, the component that has been successfully gripped. After that, the component thus gripped is rolled onto the temporary placing table 4.

As described above, the robot 3 has an isolation function to take out only one component from among the large number of components received in the bulk component box 2.

Note that, the robot 3 may fail to grip and take out the component. The plurality of components may be entangled and rolled in a lump onto the temporary placing table 4. Alternatively, the plurality of components may be separately rolled onto the temporary placing table 4 without being entangled.

All of those states can be easily distinguished by imaging the temporary placing table 4 with the two-dimensional vision sensor 5 immediately after the robot 3 performs the operation described above.

For example, when the robot 3 fails to take out the component from the bulk component box 2, the pick-up operation with the robot 3 is performed again.

Further, when the plurality of components are entangled and rolled in a lump onto the temporary placing table 4, the components are brought out of line with, for example, removal mechanism 4a for inverting the top plate of the temporary placing table 4.

Note that, the operation of "out of line" can be easily performed, for example, through disposal of the components into a prepared component disposal box (not shown).

Meanwhile, when the plurality of components are rolled onto the temporary placing table 4 without being entangled, one of the robots in the robot group 6 in a subsequent stage handles the components one by one. Alternatively, after only one of the components is handled, residual components are brought out of line with, for example, the removal mechanism 4a for inverting the top plate of the temporary placing table 4.

The two-dimensional vision sensor 5 includes a widely used sensor, and functions as component profile measuring means for acquiring profiles of the components rolled onto the temporary placing table 4 by imaging the same. Subsequently, the profiles of the components, which are acquired through the measurement, can be used in calculation of positions and orientations of the components.

An arithmetic calculation process for the positions and orientations of the components is performed, for example, according to a template matching method in the two-dimensional vision sensor 5 or the control device 7.

In the template matching method, template images are registered in advance. Here, the template images are registered as many as the number of orientations of components to be handled that stably rest after being rolled onto the temporary placing table 4.

The number of images to be registered with respect to the component to be handled is as follows. One image is registered with respect to a component that can be handled irrespective of front or rear. Two images are registered with respect to a component that needs to be handled based on a difference between front and rear. Five images are registered with respect to a component that rests in five patterns.

Note that, when a component to be handled has a cylindrical shape, and axial angles thereof need to be distinguished from each other, the angles are fixed with a dedicated jig provided to the temporary placing table 4, or the angles are determined through passing operations by the robot group 6.

In the robot group 6, the robot 6a picks up the component from the temporary placing table 4 with the parallel chuck hand. Subsequently, the component is transferred between the robots 6a, 6b, and 6c while being subjected to a front-back inversion. After that, the robot 6c arranges the component in alignment onto the pallet 8 for component alignment.

Here, description is made of a procedure for handling components by the component supply operation.

First, the three-dimensional vision sensor 1 recognizes the components, and positions and orientations of parts (such as a part protruding like a lobe, or a part estimated to have a protruding shape) of grippable ones of the recognized components are targeted to one.

Next, the control device 7 operates the robot 3 so that the targeted position and orientation and positions and orientations of the claws 3t of the hand 3h of the robot 3 match each other, and then closes the claws 3t to grip the component.

Subsequently, the robot 3 takes out the component from the bulk component box 2, opens the claws 3t above the temporary placing table 4 so as to roll the component onto the temporary placing table 4. In this way, the component is placed onto the temporary placing table 4.

As a result, the component rests on the temporary placing table 4 in one orientation of some patterns of stable conditions. Here, for the sake of simplicity, description is made of a case where components are placed on the temporary placing table 4 without being entangled or overlapped.

Further, a state in which the components are placed on the temporary placing table 4 without being entangled or overlapped is referred to as "isolated state."

Next, the two-dimensional vision sensor 5 recognizes a position and orientation of the component placed on the temporary placing table 4 with template images registered in advance and according to a pattern matching method.

At this time, when the component has a plurality of stable conditions, the two-dimensional vision sensor 5 executes a recognition program with respect to each of all the stable conditions, and adopts, among recognition results of the stable conditions, a result of the highest reliability as the entire recognition result.

As described above, when the component can be handled irrespective of front or rear, the number of stable orientations is only one.

By the process described above, which stable condition and which position and orientation the component placed on the temporary placing table 4 is in can be three-dimensionally grasped.

This is because, under a state in which the height of the temporary placing table 4 has already been known and the component has been isolated, when the stable condition can be distinguished, a height of the component is determined, and hence the component has orientation misalignment merely in in-plane rotation.

Note that, in-plane displacement and the in-plane rotation of the component can be measured with the two-dimensional vision sensor 5.

The two-dimensional vision sensor 5 outputs "pattern identification information" indicating which of the template images coordinates of the position and orientation of the component match.

Further, the two-dimensional vision sensor 5 also outputs "identification information" indicating that the component is not present on the temporary placing table 4, the component is out of a field of vision of the sensor, or the coordinates of the position and orientation of the component match none of the template images.

As described above, after the two-dimensional vision sensor 5 three-dimensionally measures the position and orientation of the component rolled on the upper surface of the temporary placing table 4, the robot 6a, which is one of the robots in the robot group 6, grips the components by one of movements preset in accordance with each of the stable conditions. Then, the robot 6a performs an operation of passing the component with respect to the robot 6b.

Subsequently, based on the stable condition of the component, which has been measured with the two-dimensional vision sensor 5, the robot 6b can know the movement pattern of the robot 6a, and hence the robot 6b performs an operation of passing the component with respect to the robot 6a by one of movements preset in accordance with the stable conditions.

Lastly, similarly to the robot 6b, based on the stable condition of the component, which has been recognized with the two-dimensional vision sensor 5, the robot 6c can know the movement pattern of the robot 6b, and hence the robot 6c performs an operation of passing the component with respect to the robot 6b by one of movements preset in accordance with the stable conditions. Then, the robot 6c supplies the component in alignment onto the pallet 8 for alignment.

After passing the component to the robot 6b, the robot 6a moves to grip a subsequent component on the temporary placing table 4. After passing the component to the robot 6c, the robot 6b moves to be ready for passing the subsequent component from the robot 6a. After aligning the component, the robot 6c moves to be ready for receiving the component from the robot 6b.

By the procedure described above, a pipeline process in which the robots 3 and 6a to 6c are constantly operated can be performed. Thus, even when the orientation of the component is changed a plurality of times, a component alignment interval is determined based on the longest one of time periods required for the single robots to perform single movements to move a component. Note that, it has been experimentally confirmed that operation time periods of the robots are substantially equal to each other.

FIG. 5 is a flowchart illustrating an overall operational sequence according to the first embodiment of the present invention. Operating procedures of the three-dimensional vision sensor 1, the robot 3, the two-dimensional vision sensor 5, and the robots 6a to 6c are illustrated in parallel association with each other.

The sequence of FIG. 5 is implemented as software of a control program, and is stored in the control device 7.

As indicated by the dotted-line arrow in FIG. 5, an operation of the three-dimensional vision sensor 1 is started in response to a processing procedure of the robot 3 (Step S12 described below). First, a depth map of the components in the bulk component box 2 is measured (Step S1).

Subsequently, the three-dimensional vision sensor 1 optimizes a gripping candidate (Step S2), and sends coordinates of the gripping candidate to the robot 3 via the control device 7 as indicated by the dotted-line arrow (Step S3). After the operations of Steps S1 to S3 are completed in this way, the processing procedure returns to Step S1.

The robot 3 first moves to withdrawal coordinates so as not to block the field of vision of the three-dimensional vision sensor 1 (Step S11), and requests the above-mentioned measurement by the three-dimensional vision sensor 1 (Step S12).

After acquiring the coordinates of the gripping candidate through the measurement by the three-dimensional vision sensor 1, the robot 3 moves to the gripping coordinates (Step S13), and performs a closing operation of the hand 3h so as to grip the gripping candidate (Step S14).

Subsequently, the robot 3 moves to coordinates on the temporary placing table 4 (Step S15), and performs an opening operation of the hand 3h so as to roll the gripped component onto the temporary placing table 4 (Step S16). After the operations of Steps S11 to S16 are completed in this way, the processing procedure returns to Step S11.

As indicated by the dotted-line arrow, an operation of the two-dimensional vision sensor 5 is started in response to a processing procedure of the robot 6a (Step S32 described below). First, an image of the upper surface of the temporary placing table 4 is measured (Step S21).

Then, the two-dimensional vision sensor 5 performs the pattern matching between the measured image and the template images (Step S22), and sends pattern identification information and gripping coordinates to the robot 6*a* via the control device 7 as indicated by the dotted-line arrow (Step S23). After the operations of Steps S21 to S23 are completed in this way, the processing procedure returns to Step S21.

The robot 6*a* first moves to withdrawal coordinates so as not to block the field of vision of the two-dimensional vision sensor 5 (Step S31), and requests the above-mentioned measurement by the two-dimensional vision sensor 5 (Step S32).

After acquiring the pattern identification information and the gripping coordinates through the measurement by the two-dimensional vision sensor 5, the robot 6*a* determines to which of Steps S31, S32, and S34 the processing procedure branches based on results of the measurement (component information in the control device 7), and performs a branch operation based on results of the determination (Step S33).

When the gripping coordinates acquired from the two-dimensional vision sensor 5 are appropriate, the robot 6*a* moves to the gripping coordinates on the temporary placing table 4 (Step S34), and performs a closing operation of a hand so as to grip the component on the temporary placing table 4 (Step S35).

Subsequently, the robot 6*a* moves into an orientation of passing the component to the robot 6*b* adjacent thereto (Step S36), and shifts to a reception standby mode for the component (Step S37). As indicated by the dotted-line arrow, Step S37 links to a component standby mode of the robot 6*b* (Step S42).

As indicated by the dotted-line arrow, at a time point of confirming a hand closing operation of the robot 6*b* (Step S44), the robot 6*a* performs an operation of opening the hand so as to pass the component that has been gripped thereby to the robot 6*b* (Step S38). After the operations of Steps S31 to S38 are completed in this way, the processing procedure returns to Step S31.

The robot 6*b* first moves to withdrawal coordinates so as not to interfere with a movement space of the robot 6*a* (Step S41), and shifts to the standby mode for the component from the robot 6*a* (Step S42) in response to the reception standby mode of the robot 6*a* (Step S37).

The robot 6*b* moves to component passing coordinates of the robot 6*a* (Step S43), and performs the operation of closing the hand so as to grip the component that has been gripped by the robot 6*a* (Step S44).

Subsequently, the robot 6*b* changes the orientation of the component (Step S45), moves into an orientation of passing the component to the robot 6*c* adjacent thereto (Step S46), and shifts to a reception standby mode for the component (Step S47). As indicated by the dotted-line arrow, Step S47 links to a component standby mode of the robot 6*c* (Step S52).

As indicated by the dotted-line arrow, at a time point of confirming a hand closing operation of the robot 6*c* (Step S54), the robot 6*b* performs an operation of opening the hand so as to pass the component that has been gripped thereby to the robot 6*c* (Step S48). After the operations of Steps S41 to S48 are completed in this way, the processing procedure returns to Step S41.

The robot 6*c* first moves to withdrawal coordinates so as not to interfere with a movement space of the robot 6*b* (Step S51), and shifts to the standby mode for the component from the robot 6*b* (Step S52) in response to the reception standby mode of the robot 6*b* (Step S47).

The robot 6*c* moves to component passing coordinates of the robot 6*b* (Step S53), and performs the operation of closing a hand so as to grip the component that has been gripped by the robot 6*b* (Step S54).

Subsequently, the robot 6*c* changes the orientation of the component (Step S55), moves to component insertion coordinates with respect to the pallet 8 (Step S56), and performs an operation of opening the hand so as to insert the component that has been gripped thereby onto the pallet 8 (Step S57). After the operations of Step S51 to Step S57 are completed in this way, the processing procedure returns to Step S51.

Here, specific description is made of the branch operation of the robot 6*a* based on the results of the measurement (component information) by the two-dimensional vision sensor 5 (Step S33).

In Step S33, the robot 6*a* performs the following determination process based on the results of the measurement, and the branch operation based on the results of the determination.

First, when the result of the measurement by the two-dimensional vision sensor 5 indicates a state (A) in which there is no component on the temporary placing table 4, the robot 6*a* returns to Step S31, and moves to its standby coordinates. Simultaneously, the control device 7 determines that the operation of the robot 3 is not performed properly, and issues an operation command with respect to the robot 3 so as to command the robot 3 to perform the series of operations (Steps S11 to S16) again.

Further, when the result of the measurement by the two-dimensional vision sensor 5 indicates a state (B) in which the component on the temporary placing table 4 is out of the field of vision of the two-dimensional vision sensor 5, the robot 6*a* performs an operation of removing the component from the temporary placing table 4. Specifically, the robot 6*a* forces the component on the temporary placing table 4 out so as to remove the same from the temporary placing table 4.

Alternatively, a process such as operating, in response to an instruction from the control device 7, the removal mechanism 4*a* provided to invert the top plate of the temporary placing table 4 is performed.

After removing the component from the temporary placing table 4, the robot 6*a* returns to Step S31 to move into the standby orientation. Simultaneously, the control device 7 issues the operation command with respect to the robot 3 so as to command the robot 3 to perform the series of operations (Steps S11 to S16) again.

Still further, when the result of the measurement (component information) by the two-dimensional vision sensor 5 indicates a state (C) in which a resting orientation of the component on the temporary placing table 4 is subsequently inverted a larger number of times, the robot 6*a* performs an operation of reducing the number of times of inverting the orientation, such as touching and laying down the component on the temporary placing table 4.

After completing the operation of reducing the number of times of inverting the component orientation, the robot 6*a* returns to Step S32 to perform the measurement operation with the two-dimensional vision sensor 5 again.

Yet further, when the result of the measurement (component information) by the two-dimensional vision sensor 5 indicates a state (D) in which components of a plurality of types are present, which are handled as supply objects by the component supply apparatus of the present invention, and positions and orientations thereof are inappropriate, the robot 6*a* performs the operation of removing the components from the temporary placing table 4, and returns to Step S31 to move into the standby orientation. Simultaneously, the control device 7 issues the operation command with respect to the robot 3 so as to command the robot 3 to perform the series of operations (Steps S11 to S16) again.

When the components of a plurality of types are handled as supply objects as in the state (D), compartments are formed in the bulk component box 2 so that the components of different types are supplied separately from each other. An operator may misplace a component into a compartment for another type.

In this case, when the robot 3 performs extracting operations sequentially with respect to the compartments and comes across the misplaced component, the robot 3 extracts a component that is different from a component in the original order, and places the component on the temporary placing table 4. However, based on a result of pattern measurement by the two-dimensional vision sensor 5, it can be determined that the extracted component is of another type.

As described above, the component supply apparatus according to the first embodiment (FIGS. 1 to 5) of the present invention includes the bulk component box 2 for receiving bulk components, the three-dimensional vision sensor 1 (depth map measuring means) for measuring the depth map (FIG. 2) of the components in the bulk component box 2, the robot 3 (isolation means) for gripping and picking up a component from the bulk component box 2 based on the depth map, and the robot group 6 (position and orientation changing means) for changing a position and orientation of the component isolated by the robot 3 into a position and orientation that involve an error of a certain level or less with respect to a final position and orientation that are specified in advance.

The position and orientation changing means includes the robot group 6 (second robot) for receiving the component from the robot 3 and changing the position and orientation of the component.

Further, the isolation means includes the temporary placing table 4 onto which one or more of the components that are released (and rolled) after being gripped by the robot 3 are placed.

Further, the position and orientation changing means includes the two-dimensional vision sensor 5 (component profile measuring means) for measuring a profile of the component on the temporary placing table 4. The robot group 6 (second robot) picks up the component that is rolled on the temporary placing table 4, and changes the position and orientation of the component.

Still further, the component supply apparatus according to the first embodiment of the present invention includes the control device 7 for controlling an operation and operation timing of the robot 3 (first robot) and the robot group 6 (second robot), and an operation and operation timing of the three-dimensional vision sensor 1 and the two-dimensional vision sensor 5.

The robot group 6 includes the plurality of robots 6*a* to 6*c*, and is configured to change the position and orientation of the component picked up from the temporary placing table 4 while passing the component between the plurality of robots 6*a* to 6*c*.

According to the first embodiment of the present invention, the bulk components are positioned onto the temporary placing table 4 by the three-dimensional vision sensor 1 and the robot 3, and the position and orientation of each of the components are recognized by the two-dimensional vision sensor 5. Then, the components are handled through the pipeline process while being transferred between the plurality of robots 6*a* to 6*c*, and aligned onto the pallet 8. Thus, the bulk components can be aligned within a short period of time.

Further, a parallel processing time period can be suppressed to be equivalent to an operation time period of each of the robots 3 and 6*a* to 6*c*. Thus, even when the components have complicated shapes, elongation of a cycle time of the alignment process can be avoided.

Still further, switching in accordance with production models can be rapidly performed only by changing software, and hence dedicated hands for the components need not be respectively prepared. As a result, it is possible to reduce costs of the hands, save time periods for designing the hands, and save a temporary placing space for the hands.

Yet further, also when the components of a plurality of types are handled as supply objects, dedicated hands for the components need not be respectively prepared. As a result, it is possible to reduce costs of the hands, save time periods for designing the hands, and save a temporary placing space for the hands.

In addition, in the configuration of FIG. 1, the three-dimensional vision sensor 1 and the two-dimensional vision sensor 5 are provided separately from the robots 3 and 6*a*. However, there may be employed a hand-eye configuration in which the three-dimensional vision sensor 1 may be mounted to a lateral side of the hand of the robot 3, and the two-dimensional vision sensor 5 is mounted to a lateral side of the hand of the robot 6*a*. In this case, a tact time is increased. However, the size of the bulk component box 2 can be set to be larger than the field of vision of the three-dimensional vision sensor 1, and the size of the temporary placing table 4 can be set to be larger than the field of vision of the two-dimensional vision sensor 5.

Second Embodiment

Note that, although not particularly referred to in the first embodiment (FIGS. 1 to 5) described above, there may be provided parameter optimization means for selecting an optimum parameter so as to maximize a rate of success in picking up the components in the bulk component box 2 at the time of the operation of the robot 3 relating to the three-dimensional vision sensor 1 and the control device 7.

In the following, with reference to FIGS. 1 to 4, description is made of a second embodiment of the present invention, in which the parameter optimization means is provided.

In the operation of the robot 3, there is an operation of, after operating the robot 3 so that a position and orientation of a lobe of a component and the positions and orientations of the claws 3*t* of the hand 3*h* of the robot 3 match each other, closing the claws 3*t* to grip the component.

At this time, it is necessary to control to what extent the opening width W between the claws 3*t* of the hand 3*h* is set at the time when the claws 3*t* are brought close to the component, or at what extent of the opening width W the claws 3*t* are applied to the lobe of the component at the time of matching the positions and orientations, in what orientation the claws 3*t* are applied to the lobe of the component, to what position and orientation relative to the lobe of the component the claws 3*t* are moved and stopped, and along what trajectory the hand 3*h* are raised after the claws 3*t* are closed to grip the component. In other words, it is necessary to adjust parameters, specifically, a value of the opening width W, a value of the orientation, and numerical values that determine a trajectory pattern.

Experiments have confirmed that there is a relationship between values of the parameters and the isolation success probability P for each of the components. The isolation success probability P has an inseparable relationship with an occurrence probability of a redo operation, and hence influences an increase and decrease in tact time. Therefore, when the isolation success probability P is low, the tact time becomes longer.

For those reasons, it is important to select parameters that reduce the tact time.

In view of this, in the component supply apparatus according to the second embodiment of the present invention, the robot 3 or the control device 7 is provided with the parameter optimization means. The parameter optimization means is activated by the control device 7.

At the time of operating the robot 3, the control device 7 controls, for example, the opening width W between the claws 3t of the hand 3h. The opening width W is stored as one of the parameters. Note that, default values of the parameters are preset.

When the parameter optimization means is activated, while changing the parameters according to a preset method, the robot 3 repeats an experimental trial of observing the isolation success probability P corresponding to a certain combination of the values of the parameters.

At this time, a plurality of combination map data items corresponding to the preset values of the parameters and the isolation success probabilities P obtained at the values of the parameters are stored sequentially into the control device 7.

Then, relationships between the combinations of the parameters and the isolation success probabilities P are modeled, for example, by a regression equation. Further, after the experimental trial is performed a certain number of times, the parameters are optimized by using the model. In other words, a vector of the parameter value at which the highest isolation success probability P is obtained is read.

Further, at the time of performing the trial, the combinations of the parameters subjected to the trial may be optimized so that a precise mathematical model is obtained.

Note that, when the combinations of the parameters are optimized prior to a start of the trial, suited methods such as an orthogonal array or a D-optimal design may be used. Alternatively, the optimization may be dynamically performed in the middle of the trial. In this case, a method of automatically generating experimental conditions, which is disclosed in a known document (for example, Japanese Patent Application Laid-open No. 2008-36812) may be used.

Next, with reference to FIG. 6, description is made of a specific example of a parameter at the time of the operation of the robot 3 in the second embodiment of the present invention.

Figure 6A:
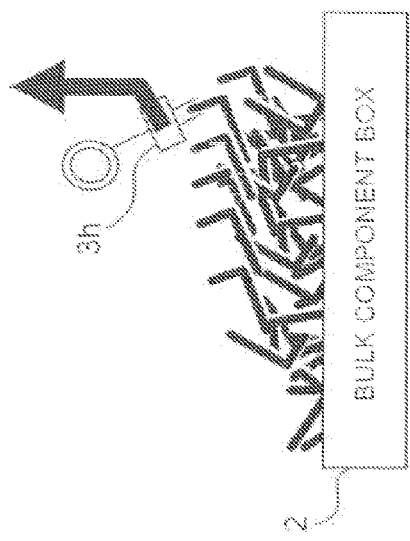
FIG. 6 are explanatory views of a specific example of a parameter at the time of a robot operation in a second embodiment of the present invention.
Figure 6B:
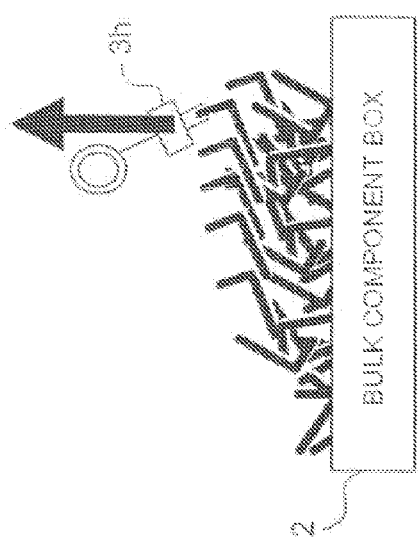
Figure 6C:
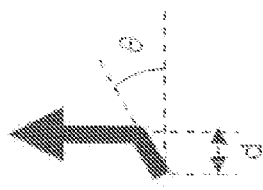
Figure 6D:
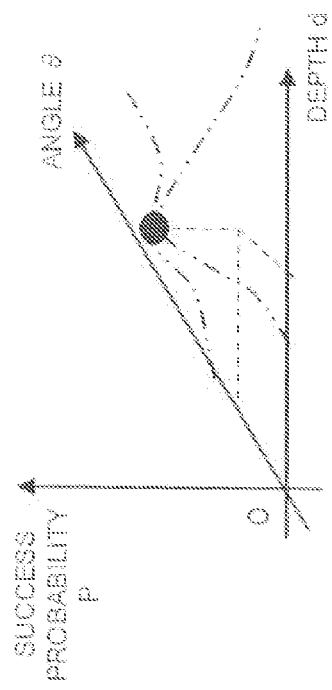

In FIG. 6, FIG. 6(a) illustrates a pick-up operation at a low isolation success probability P, FIG. 6(b) illustrates a pick-up operation at a high isolation success probability P according to the second embodiment of the present invention, FIG. 6(c) shows parameters of an operation of the hand 3h in FIG. 6(b), and FIG. 6(d) shows a combination (indicated by the solid circle) of parameters (horizontal distance d and angle θ), which maximizes the isolation success probability P.

As indicated by a thick-line arrow in FIG. 6(a), the hand 3h grips and draws vertically and directly upward one of the components in the bulk component box 2.

Meanwhile, as indicated by thick-line arrows in FIGS. 6(b) and 6(c), the hand 3h gripping the component moves the horizontal distance d in a direction of the angle θ, and then draws vertically upward the component.

In the operation of the robot 3, when only one component is drawn out from the bulk components, the gripped component and non-gripped components are held in contact with each other. Thus, at the time of being drawn up, the gripped component thrusts aside the non-gripped components.

In other words, while the gripped component is moved along a draw-out trajectory, an external force is applied to the gripping point. The external force impairs a stable gripping state in an initial stage of the gripping, which causes a decrease in isolation success probability P.

In view of this, in order to increase the isolation success probability P, at the time of gripping one of the components, it is effective to draw vertically upward the one of the components after moving the hand 3h the horizontal distance d in the direction of the angle θ as indicated by the trajectory in FIG. 6(b) instead of immediately drawing up the hand 3h vertically and directly upward as indicated by the trajectory (thick-line arrow) in FIG. 6(a).

When the hand 3h is operated along the trajectory in FIG. 6(b), an influence of the external force is reduced, with the result that the isolation success probability P can be increased. However, the parameters depend on shapes and sizes of the components.

As a countermeasure, in the parameter optimization means according to the second embodiment of the present invention, an orthogonal array is used to combine the angles θ and the horizontal distances d with each other, and the trial is performed n times with respect to each of the combinations of the parameters. In this way, map data items of the isolation success probabilities P corresponding to the combinations of the angles θ and the horizontal distances d are obtained.

After that, the following coefficients A, B, C, D, and E are calculated by a regression equation that expresses the isolation success probability P as a function of the angle θ and the horizontal distance d so as to calculate the isolation success probability P, for example, by the following equation (1).

$$P = A \times \theta^2 + B \times \theta + C \times d^2 + D \times d + E \quad (1)$$

Note that, for example, a least-square method is used to determine the coefficients A, B, C, D, and E.

After the regression equation is obtained, the angle θ and the horizontal distance d that maximize the isolation success probability P are read from the map data items.

In this way, the trial and the calculation of the coefficients A, B, C, D, and E of the regression equation are performed, and the parameters (angle θ and horizontal distance d) that maximize the isolation success probability P are read based on the regression equation thus obtained. As a result, as shown in FIG. 6(d), selected values of the angle θ and the horizontal distance d are determined.

As described above, according to the second embodiment (FIG. 6) of the present invention, the robot 3 or the control device 7, which serves as the isolation means, includes the parameter optimization means. The parameter optimization means stores, through observation, the pick-up success rates while automatically changing the parameters that define the operation of picking up components from the bulk component box 2, and selects parameters corresponding to the highest one of the pick-up success rates.

With this, the best parameters (angle θ and horizontal distance d) that increase the isolation success probability P and reduce the tact time can be automatically selected at the time of picking up components from the bulk component box 2.

Third Embodiment

Note that, functions and features of the portions are not collectively referred to in the first or second embodiment described above. However, an advantage in alignment of the bulk components according to the present invention is obtained by the following first to fifth features (functions).

First, the first feature is that the depth map measuring means including the three-dimensional vision sensor 1 and the control device 7 is provided.

For example, in conventional apparatus, positions and orientations for gripping components are preset in accordance with respective component types. Meanwhile, the present invention has a function to flexibly change gripping positions and subsequent operations based on measurement data obtained through measurement with the three-dimensional vision sensor 1 immediately before the gripping operation without individual presetting.

Further, in the present invention, the measurement with the three-dimensional vision sensor 1, the two-dimensional vision sensor 5, and the control device 7 is performed at least twice so that the component can be transferred from the bulk state into the alignment state on the pallet 8.

The second feature is that the three-dimensional vision sensor 1, the robot 3, and the control device 7 (isolation means) are provided. This isolation function is advantageous in taking out the component from the bulk component box 2.

In conventional apparatus, positions and orientations that allow object components to be gripped are obtained based on measurement values from sensors. However, actually, in the bulk component box 2, components other than components to be gripped are present around the components to be gripped. Thus, the other components may interfere with the hand 3h at the time of gripping a component, and the hand 3h may thrust away the other components therearound.

As a result, in the conventional apparatus, positions and orientations of the components are disturbed, and the components frequently fail to be gripped. Further, in a case where the component to be gripped is found at an end portion in the bulk component box 2, when the robot 3 approaches the component to be gripped, the hand 3h and partition plates and walls in the bulk component box 2 frequently interfere with each other. As a result, the components may fail to be gripped with high probability.

As a countermeasure, in the present invention, the three-dimensional vision sensor 1 and the robot 3 (isolation means) search for parts that can be gripped by applying the claws 3t thereto in consideration of the interference with the other components and the like, and then move the claws 3t to grip the component to be gripped. Thus, there is an advantage that the component to be gripped is reliably gripped with high probability.

Further, the isolation function of the robot 3 is advantageous also during the process of aligning the components that have been rolled on the temporary placing table 4 onto the pallet 8.

Specifically, a finite number of sequential orders are preset correspondingly to orientations of the rolled components so as to specify positions and orientations of the components to be gripped subsequently by the hands in the robot group 6. Then, which of the sequential orders is selected can be determined based on the result of measurement values obtained from the two-dimensional vision sensor 5. In this way, the sequences of the gripping positions and orientations are flexibly changed, and thus a success probability of component alignment can be reliably increased.

The third feature resides in how to use the sensor measurement values obtained from the three-dimensional vision sensor 1 and the control device 7 (depth map measuring means).

In the conventional apparatus, matching between a shape model of the entire component and measurement data is performed. Meanwhile, in the present invention, grippable parts of components (such as a lobe of a component) are searched for, and claw tips are moved to a position at which the part is accommodated between the claws 3t. Then, the robot 3 is operated to move the claw tips, and then the claws 3t are closed. This function provides an advantage that the component can be reliably gripped with high probability.

The fourth feature is the temporary placing table 4, the two-dimensional vision sensor 5, the robot group 6, and the control device 7 (position and orientation changing means).

In the conventional apparatus, only one position and orientation that allow a component to be gripped (relative positions and orientations of the component and the claws) are preset. Once the component is gripped, an operation is performed while continuously gripping the component under a state in which the relative orientations are fixed without changing the preset position and orientation until the end of the operation.

In other words, in the conventional apparatus, even when the robot 3 successfully grips a component from the bulk component box 2, the gripped component is taken up while thrusting aside components therearound. As a result, unintentionally, there may occur a phenomenon in which the gripped component is turned or displaced by the external force, or plucked off from between the claws 3t. When the gripping orientation is changed unintentionally in this way, a component alignment operation fails.

As a countermeasure, in the present invention, the temporary placing table 4, the two-dimensional vision sensor 5, the robot group 6, and the control device 7 (position and orientation changing means) process the results of the measurement by the three-dimensional vision sensor 1 and the control device 7 (depth map measuring means). With this, the gripping positions can be changed based on the values measured by the two-dimensional vision sensor 5 without restricting the number of the relationships between the components on the temporary placing table 4 and the positions and orientations to only one.

In this way, according to the present invention, a risk of failing in the component alignment operation can be reduced.

As an example, experiments have confirmed that a success probability of an operation of aligning components of a certain type reaches ninety percent or more. Even when the alignment operation fails, under the success probability as described above, a risk of successive fails can be markedly reduced by repeating the measurement and the gripping operation again.

The fifth feature is that the temporary placing table 4, the two-dimensional vision sensor 5, the robot group 6, and the control device 7 (position and orientation changing means) additionally have a gripping position changing function of, instead of continuously using an initial gripping orientation as the gripping orientation, releasing gripping of a component even in a middle of the operation and re-gripping the component.

The gripping position changing function of the present invention has the following advantage. Even when the phenomenon of displacement in position and orientation of a component occurs at the time of isolating the component from the bulk component box 2, the phenomenon does not influence success or failure of the entire operation of from taking out the component from the bulk component box 2 until aligning the component onto the pallet 8.

Further, the gripping position changing function has the following advantage. The component is re-gripped from another side, and hence an accuracy in position and orientation of the component, which is required in a final stage of the operation, is enhanced in comparison with a current accuracy each time the component is re-gripped. In this way, the accuracy which is required in the final stage can be obtained.

In addition, the position and orientation changing means has the following advantage.

As in the conventional apparatus, when a component is handled with only a single robot, there is a problem in that a component orientation inverting operation (for example, front-back inverting operation on the component) may fail.

This is because of the following reason. In the front-back inverting operation on the component once gripped by the single robot, the component needs to be inverted while being gripped, released from being gripped in the inverted state so as to be temporarily placed, and then re-gripped. In this context, even when the component is attempted to be temporarily placed by being released from being gripped in the inverted state, a hand is present in a gravity direction of the component, and hence the component cannot be placed on the temporary placing table.

In order to solve this problem, in the conventional apparatus, for example, an exclusively-designed component nip-gripping jig that is power-controlled independently of the robot is mounted to equipment so as to successfully re-grip a component. However, there arises another problem in that additional time and cost are required at the time of establishment of a production system and changeover to new equipment.

Meanwhile, in the present invention, the component to be re-gripped is transferred while being inverted in the air by the robot group 6 (plurality of robots 6a to 6c) provided as the position and orientation changing means.

With this, at the time of establishment of the production system and changeover to the new equipment, the operation of the robot group 6 can be changed to invert the component only by changing the software in the control device 7.

Note that, here, description is made of the front-back inversion as a typical example of the operation of changing the orientation of the component. However, actually, not only the front-back inversion but also other various orientation changing operations are performed on the components.

Further, in that case, at the time of finally aligning the components onto the pallet 8, the pallet 8 and claws of the hand of the robot 6c may interfere with each other depending on gripping positions of the component, which may hinder the alignment. Thus, the component needs to be gripped at a position which allows alignment onto the pallet 8.

As the position and orientation changing means as a countermeasure against restrictive conditions of the final gripping position and orientation of the component, the plurality of robots 6a to 6c are provided to change the orientation of the component rolled on the temporary placing table 4 into the final gripping position and orientation.

Figure 7:
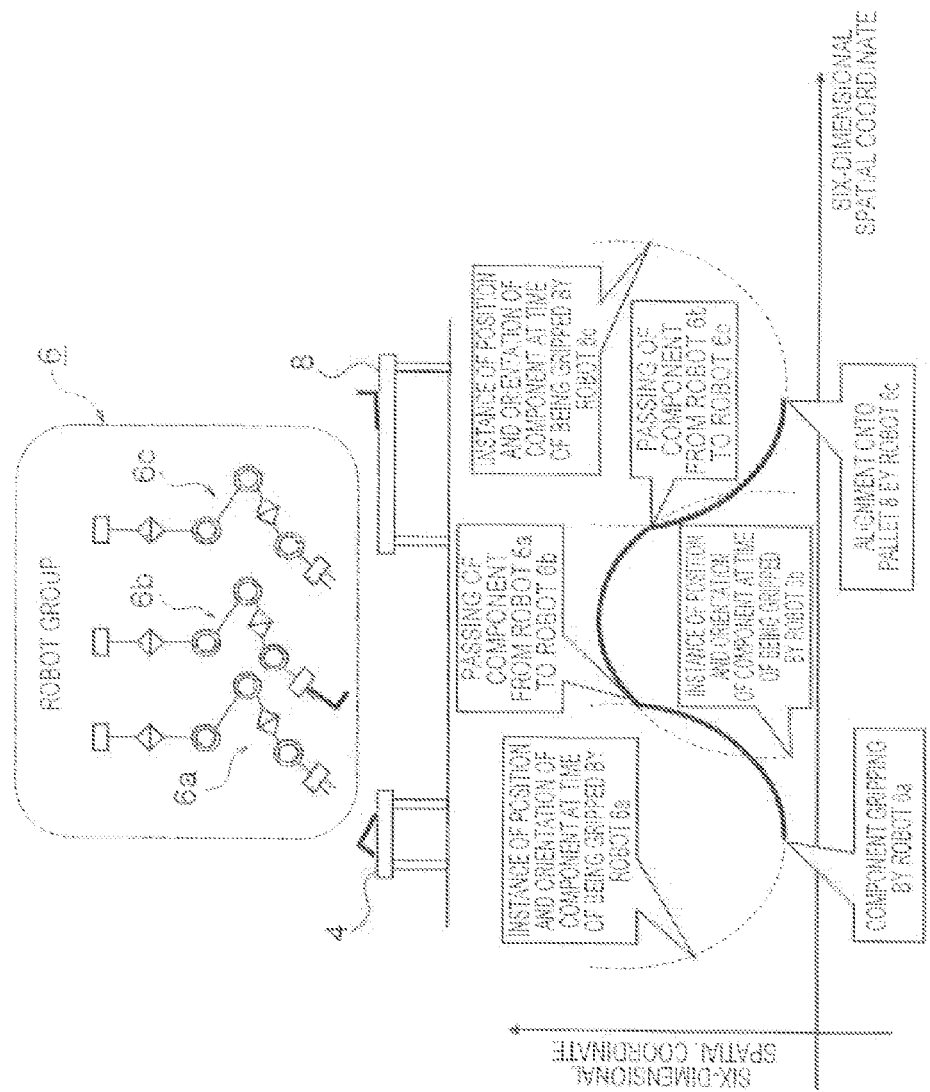
FIG. 7 is an explanatory view of a principle of an orientation changing operation according to a third embodiment of the present invention.

FIG. 7 is an explanatory view of a principle of an orientation changing operation according to the third embodiment of the present invention. An example in which the robot group 6 (three robots 6a to 6c) is used as the gripping position changing function is illustrated as six-dimensional spatial coordinates.

In FIG. 7, an instance (broken line) of a position and orientation of a component at the time of being gripped by the robot 6a, a position (connecting point between the broken line and a solid line) at which the component on the temporary placing table 4 is gripped by the robot 6a, an instance (broken line) of a position and orientation of the component at the time of being gripped by the robot 6b, a position (connecting point between the broken line and a solid line) at which the component is transferred from the robot 6a to the robot 6b, an instance (broken line) of a position and orientation of the component at the time of being gripped by the robot 6c, a position (connecting point between the broken line and a solid line) at which the component is transferred from the robot 6b to the robot 6c, and a position (connecting point between the broken line and a solid line) at which alignment onto the robot 6b is performed by the robot 6c are shown together with a side view of the robot group 6.

The robots 6a to 6c are each capable of gripping a component at a certain position (connecting point between the broken line and the solid line) and changing a position and orientation of the component gripped thereat. Possible values corresponding thereto are represented as manifolds formed within a space of a degree of freedom "6" of positions and orientations due to restriction on physical properties of each of the robots 6a to 6c.

In FIG. 7, trajectories each illustrated by a solid thick line correspond to paths of the component moved by the robot group 6, and the instances (broken lines) of positions and orientations, which are illustrated by fan-like graphics, formally express the manifolds each corresponding to the position and orientation of the component.

Occupancy spaces within the fan-like graphics (broken lines) correspond respectively to movable ranges of the robots 6a to 6c, and the occupancy spaces are each restricted. Those restrictions express restrictions on the front-back inverting operations on the components.

Note that, the manifolds each corresponding to the position and orientation should be illustrated correspondingly to gripping positions of the component. In particular, the restriction is imposed on the robot 6c in the final stage in the robot group 6 due to the interference at the gripping position at the time of alignment onto the pallet 8 as described above. Thus, when the space corresponding to the manifold representing the possible value (occupancy space within the fan-like graphic) is partially shrunk, the restriction can be expressed.

In this case, the component is transferred from the robot 6a to the robot 6b, and then from the robot 6b to the robot 6c. Thus, beyond ranges of the restrictions by the individual robots 6a to 6c on the instances (manifolds) corresponding to the positions and orientations of the components, operations of changing the positions and orientations of the component, which are required for the alignment from the temporary placing table 4 onto the pallet 8, can be performed.

Figure 8:
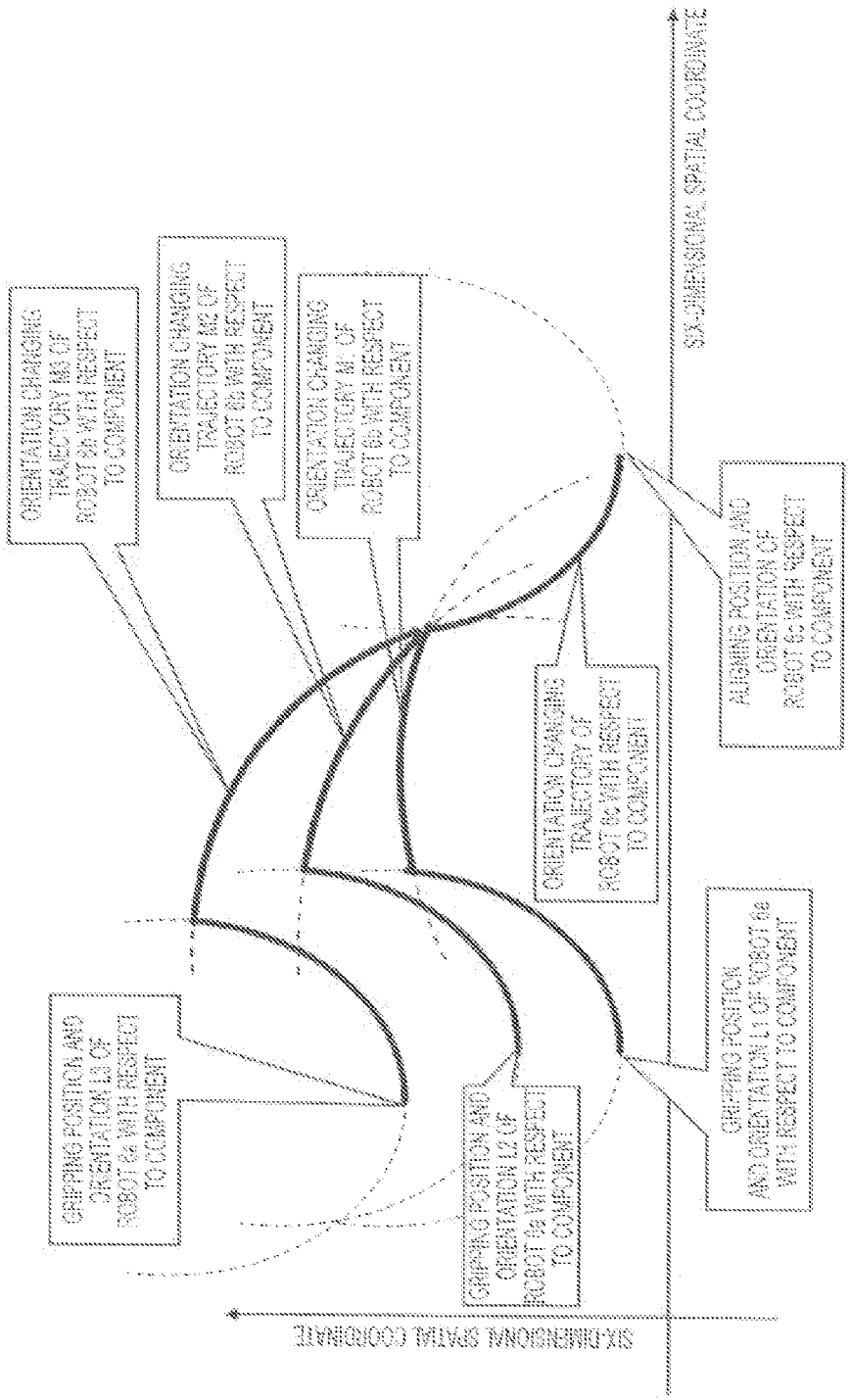
FIG. 8 is an explanatory graph showing orientation changing trajectories of three patterns according to the third embodiment of the present invention.

FIG. 8 is an explanatory graph showing orientation changing trajectories M1 to M3 of three patterns according to the third embodiment of the present invention. The orientation changing trajectories M1 to M3 are shown as six-dimensional spatial coordinates together with the manifolds represented by the fan-like graphics (broken lines) corresponding to those in FIG. 7.

In FIG. 8, by way of an example of orientation changing operations of three patterns in a case where a certain component is stabilized in orientations of three patterns at the time of being isolated and rolled onto the temporary placing table 4, gripping positions and orientations L1 to L3 of three patterns (connecting points between the broken lines and the solid lines) of the robot 6a with respect to the component on the temporary placing table 4 and the orientation changing trajectories M1 to M3 of three patterns of the robot 6b are shown in association with each other.

Note that, with regard to whether or not the "three patterns" can be obtained, it suffices that experiments are performed to statistically confirm whether or not the component are stabilized in orientations of three patterns on the temporary placing table 4. Alternatively, it suffices that measurements of orientations of the rolled components are performed with the two-dimensional vision sensor 5 to confirm whether or not measurement data items can be classified into three patterns.

Depending on shapes, the component may be stabilized irrespective of front or rear, in two patterns of front and rear, or in three patterns as in FIG. 8. Further, experiments have confirmed that a component having a complicated shape can be stabilized in orientations of five or more patterns.

Even in any of the cases of the arbitrary number of (one to five) patterns in which the component is stabilized in orientation, the operational sequence for the gripping positions and orientations can be designed from the position and orientation of the component on the temporary placing table 4 to the position and orientation at the time of being finally aligned onto the pallet 8 via the robot group 6.

Specifically, the position and orientation of the component on the temporary placing table 4 are measured with the two-dimensional vision sensor 5, and the operational sequence is selected in accordance with corresponding one of the patterns. Then, the position and orientation that allow the component to be gripped are calculated, and the selected operational sequence is performed by the control device 7.

In this way, the advantage of enabling the components supplied in bulk to be supplied in alignment onto the pallet 8 can be obtained.

Note that, in the case described above, the components to be supplied are finally aligned onto the pallet 8. However, the components need not necessarily be aligned onto the pallet 8, and may be assembled into a product by being sequentially fitted to each other in the final stage.

As a matter of course, the same advantage can be obtained also in the component supply apparatus configured to assemble the components supplied in bulk into a product in this way.

Further, in the case described above, the measurement of the component is performed with the two-dimensional vision sensor 5 only once. However, any or all of the state in which the component is gripped by the robot 6a, the state in which the component is gripped by the robot 6b, and the state in which the component is gripped by the robot 6c may be measured with the two-dimensional vision sensor 5 (or three-dimensional vision sensor 1), and the subsequent operations of the robots may be changed. In this case, an operational sequence for taking measures against errors caused by failures in gripping is added. Thus, there is an advantage that a component supply apparatus whose success probabilities are further increased can be obtained.

As described hereinabove, the operating principle of the present invention is featured in that dynamic changes of a gripping position of a component based on a measurement value obtained at a certain time point from a sensor effectively contributes to control of a variable position and orientation of each bulk component.

Fourth Embodiment

Note that, in each of the first to third embodiments (FIGS. 1 to 8) described above, the three-dimensional vision sensor 1 is provided separately from the robot 3. However, as in FIG. 9, the hand-eye configuration in which the three-dimensional vision sensor 1 is mounted to a lateral side of the hand of the robot 3 may be employed.

Figure 9:
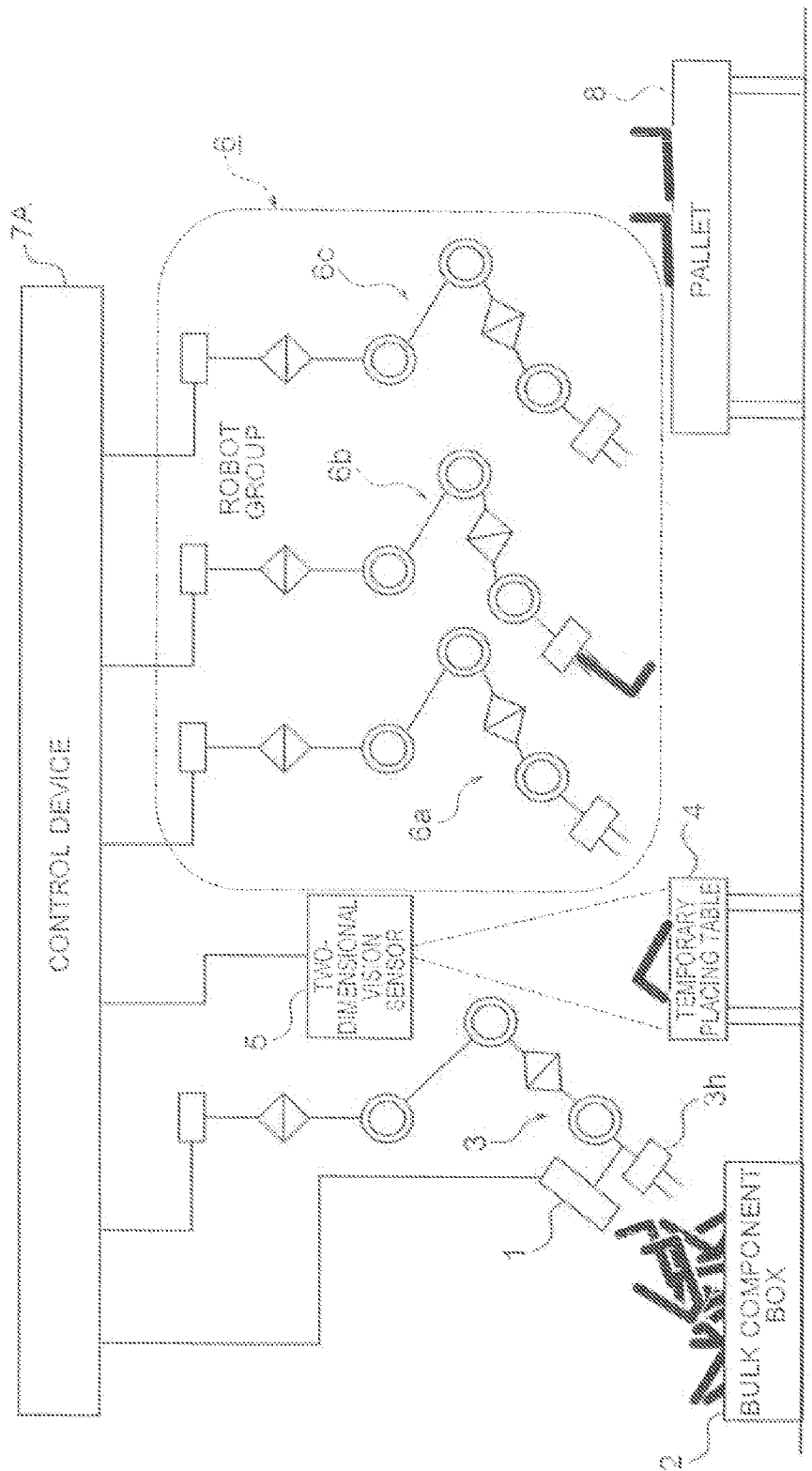
FIG. 9 is a schematic side view of an overall structure of a component supply apparatus according to a fourth embodiment of the present invention.

FIG. 9 is a schematic side view of an overall structure of a component supply apparatus according to a fourth embodiment of the present invention. In order to omit redundant description, the same components as those described above (refer to FIG. 1) are denoted by the identical reference symbols, or a suffix "A" is added to some of the same reference symbols.

A control device 7A in FIG. 9 has a control sequence program partially different from that described above.

The three-dimensional vision sensor 1 is mounted to a lateral side of the hand 3h of the robot 3 so as to form the hand-eye configuration together with the hand 3h. With this, the three-dimensional vision sensor 1 is allowed to change an imaging position and orientation along with the movement of the robot 3.

Figure 10:
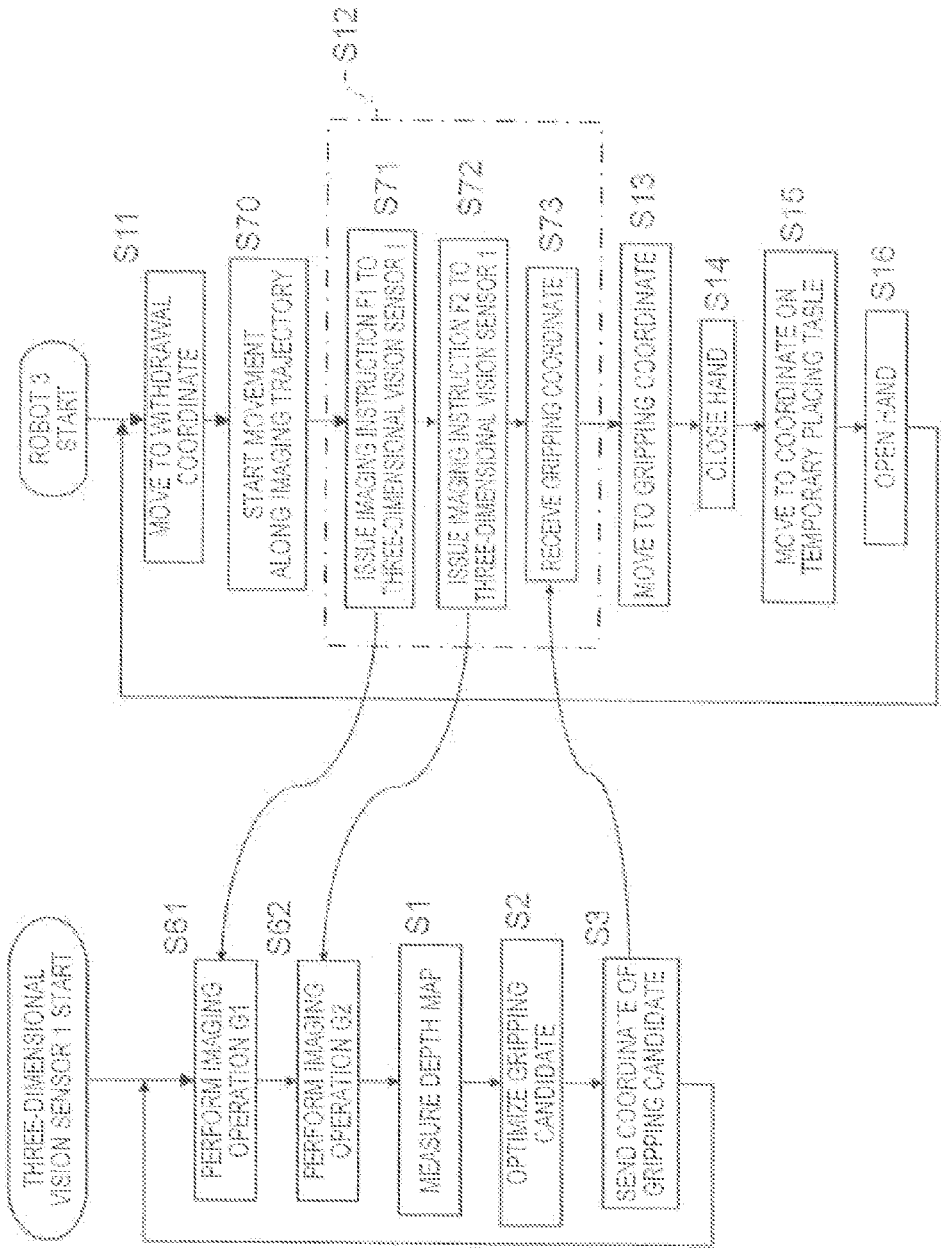
FIG. 10 is a flowchart illustrating an operational sequence according to the fourth embodiment of the present invention.

FIG. 10 is a flowchart illustrating operations of the three-dimensional vision sensor 1 and the robot 3 according to the fourth embodiment of the present invention. In order to omit redundant description, the same processing steps as those described above (refer to FIG. 5) are denoted by the identical reference symbols.

Figure 11:
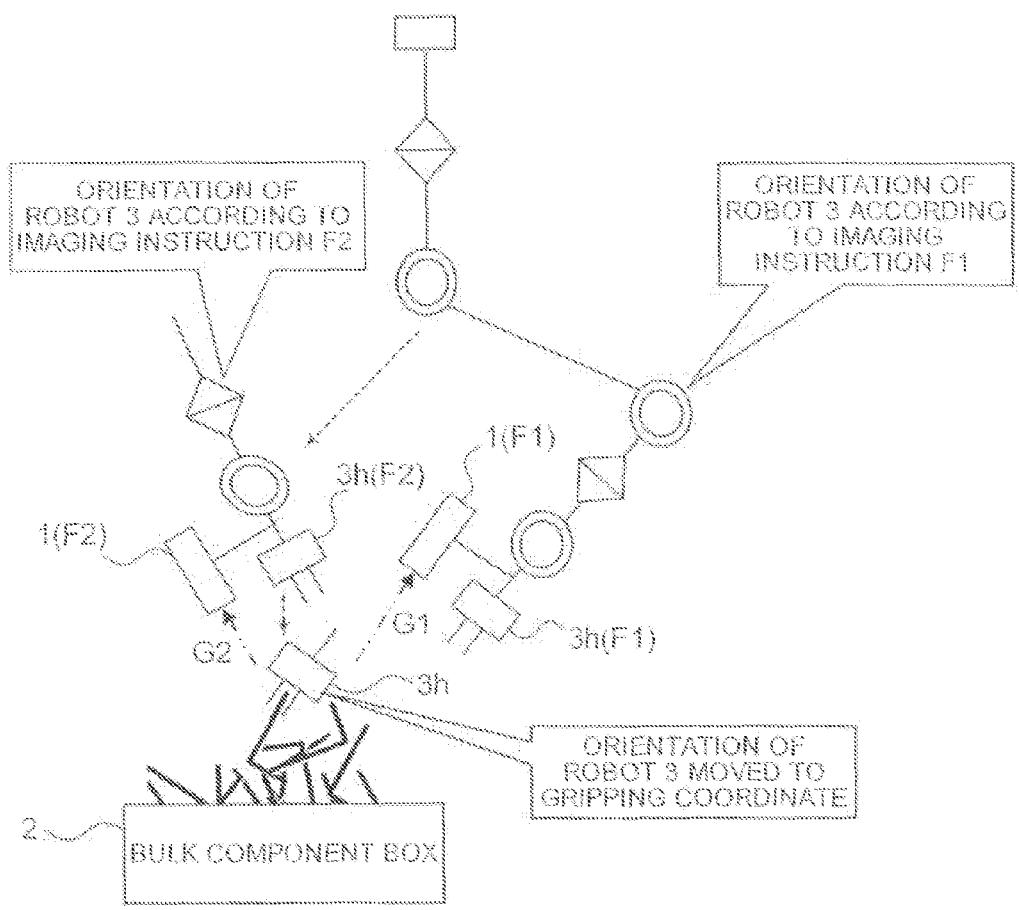
FIG. 11 is an explanatory view of operations according to the fourth embodiment of the present invention.

Further, FIG. 11 is an explanatory view of the operation of the robot 3 according to the fourth embodiment of the present invention.

In FIG. 10, Steps S71 to S73 correspond to the measurement process by the three-dimensional vision sensor 1 (Step S12).

First, the robot 3 starts from its standby position (Step S11), and starts to move along an imaging trajectory (Step S70).

Note that, the imaging trajectory refers to a trajectory of, for example, lateral movement performed so as to direct an imaging direction of an image pickup element of the three-dimensional vision sensor 1 toward the bulk component box 2 from above the bulk component box 2.

Alternatively, the imaging trajectory also refers to such a trajectory that the three-dimensional vision sensor 1 gradually approaches the bulk component box 2 while bringing the bulk component box 2 into the field of vision of the three-dimensional vision sensor 1, or such a trajectory that the three-dimensional vision sensor 1 gradually approaches the bulk component box 2 while drawing a geometric curve (such as spiral or circular arc).

Next, subsequently to Step S70, during the movement of the robot 3 along the imaging trajectory, imaging instructions of a plurality of times (twice in this case), that is, imaging instructions F1 and F2 are issued to the three-dimensional vision sensor 1 (Steps S71 and S72).

In response to this, the three-dimensional vision sensor 1 performs imaging operations of a plurality of times (twice in this case), that is, imaging operations G1 and G2 (Steps S61 and S62).

Subsequently, the three-dimensional vision sensor 1 performs the same calculation process as that described above cooperatively with the control device 7A, and measures a depth map based on a plurality of image data items obtained in Steps S61 and S62 (Step S1).

Further, the three-dimensional vision sensor 1 and the control device 7A optimize coordinates of a gripping candidate (Step S2), determine gripping coordinates, and send the coordinates of the gripping candidate to the robot 3 (Step S3). Then, the processing procedure returns to Step S61.

In response to reception of the coordinates of the gripping candidate (gripping coordinates) from the three-dimensional vision sensor 1 (Step S73), as in the above description, the robot 3 moves to the gripping coordinates thus acquired (Step S13), and performs the hand closing operation (Step S14) so as to grip a component. Next, the robot 3 moves to the coordinates on the temporary placing table 4 (Step S15), and performs the hand opening operation (Step S16) so as to roll the component onto the temporary placing table 4. Then, the processing procedure returns to Step S11.

Subsequently, the two-dimensional vision sensor 5, the control device 7A, and the robot group 6 perform the same processing operations as those described above (FIG. 5).

FIG. 11 illustrates the operations of Steps S61, S62, S70 to S73, and S13 in FIG. 10.

FIG. 11 illustrates orientations of the hand 3h (F1) and the three-dimensional vision sensor 1 (F1) according to the imaging instruction F1, orientations of the hand 3h (F2) and the three-dimensional vision sensor 1 (F2) according to the imaging instruction F2, and an orientation of the hand 3h moved to the gripping coordinates.

In FIG. 11, a broken-line arrow indicates a movement sequence of the robot 3 at the time of measurement of the gripping coordinates, and two-dot chain line arrows indicate the imaging operations G1 and G2 by the three-dimensional vision sensor 1 (F1) and (F2) at the movement positions.

As described above, according to the fourth embodiment (FIGS. 9 to 11) of the present invention, the three-dimensional vision sensor 1 is provided integrally with the robot 3 so as to form the hand-eye configuration. An imageable range of the three-dimensional vision sensor 1 and an operable range of the robot 3 substantially correspond to each other.

As a result, a tact time becomes longer than that described above. However, the three-dimensional vision sensor 1 and the robot 3 are less restricted in terms of layout, and hence system layout is more easily designed.

Further, at the time of imaging with the three-dimensional vision sensor 1, the movement of the robot 3 needs not be stopped, and hence there is an advantage that the operation time periods are reduced.

In addition, there is another advantage that a size of the bulk component box 2 may be set to be larger than the field of vision of the three-dimensional vision sensor 1.

Fifth Embodiment

Note that, in the fourth embodiment (FIGS. 9 to 11) described above, the robot group 6 (robots 6a to 6c) is used as the position and orientation changing means as in the first to third embodiments described above. However, as in FIG. 12, a single robot 6B may be used.

Figure 12:
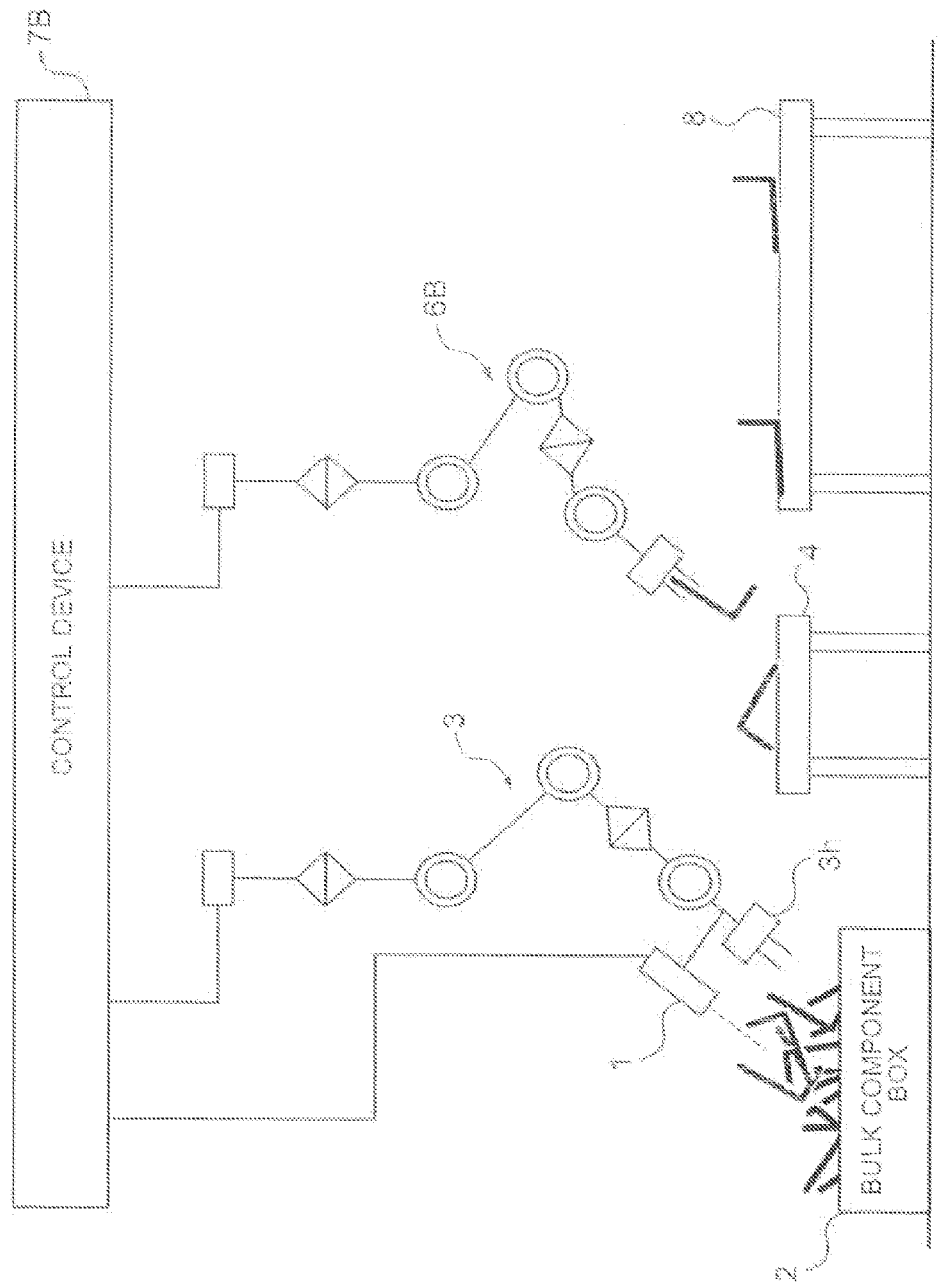
FIG. 12 is a schematic side view of an overall structure of a component supply apparatus according to a fifth embodiment of the present invention.

FIG. 12 is a schematic side view of an overall structure of a component supply apparatus according to a fifth embodiment of the present invention. In order to omit redundant description, the same components as those described above (refer to FIGS. 1 and 9) are denoted by the identical reference symbols, or a suffix "B" is added to some of the same reference symbols.

This case is different from the case described above (FIG. 9) in that the position and orientation changing means for a component from the temporary placing table 4 to the pallet 8 is formed of the single robot 6B. Further, in this case, the two-dimensional vision sensor 5 described above is omitted, and hence a control sequence program in a control device 7B is partially different from that described above.

In FIG. 12, the robots 3 and 6B each include general vertical articulated robots, horizontal joint robots, and linear motion robots.

The robot 3 includes the hand 3h having the tweezers-like or forcipate thin claws 3t (refer to FIGS. 3 and 4), and the robot 6B includes the parallel chuck hand.

The three-dimensional vision sensor 1 (depth map measuring means) mounted integrally with the hand 3h of the robot 3 calculates a depth map of object components in the bulk component box 2.

Further, as in the above description, the depth map is analyzed so as to calculates candidates of parts that can be gripped by the robot 3 from among the stacked-up components (parts extending in a protruding manner near the center, and recessed parts on the front side in FIG. 2). Then, through optimization, the candidates are targeted to one.

In addition, as in the above description, through the optimization calculation in which scores are given to the plurality of candidates and only one with the highest score is selected, the candidates of the components are optimized.

After that, the robot 3 carries the component to the temporary placing table 4, and does not place the component gently onto the temporary placing table 4, but releases the component above the temporary placing table 4 so as to roll the component onto the temporary placing table 4 in a throwing manner.

In this way, entangled components are disentangled, and, with high probability, roll onto and rest on the temporary placing table 4 under a state of being separated from each other one by one.

Further, as in the above description, the isolation success probability can be increased by using a region in which, of the calibration error between the coordinate system of the three-dimensional vision sensor 1 and the coordinate system of the robot 3, the orientation error is small.

Here, the three-dimensional vision sensor 1 (depth map measuring means) has a function as the component profile measuring means for acquiring profiles of the components rolled onto the temporary placing table 4 by imaging the same. Based on the measured profiles, positions and orientations of the components are calculated.

Note that, as in the above description, the arithmetic calculation for the positions and orientations is performed in the three-dimensional vision sensor 1 or the control device 7B. Further, the arithmetic calculation is performed, for example, according to the template matching method using template images registered in advance.

Subsequently, the robot 6B including the parallel chuck hand picks up the component from the temporary placing table 4, and arranges the component in alignment onto the pallet 8.

Next, along with a process of handling the component, description is made of the operation of the component supply apparatus according to the fifth embodiment of the present invention, which is illustrated in FIG. 12.

First, the three-dimensional vision sensor 1 (depth map measuring means) recognizes the components, and positions and orientations of grippable parts (such as a part protruding like a lobe) of the recognized components, or of parts each estimated to have a grippable shape are targeted to one.

The robot 3 is operated so that the position and orientation targeted based on the depth map and positions and orientations of the claws 3t of the hand 3h match each other, and then closes the claws 3t to grip the component. Subsequently, the robot 3 takes out the component from the bulk component box 2, and opens the claws 3t above the temporary placing table 4 so as to roll and place the component onto the temporary placing table 4.

As a result, the component rests on the temporary placing table 4 in one position and orientation of some patterns of stable states.

Here, for the sake of simplicity, description is made of a case where the component is stabilized in an isolated state (state in which components are placed on the temporary placing table 4 without being entangled or overlapped).

Next, the three-dimensional vision sensor 1 images the component on the temporary placing table 4, and recognizes a position and orientation of the component placed on the temporary placing table 4 according to the pattern matching method using the template images registered in advance and the depth map.

In this way, the position and orientation of the component rolled on the upper surface of the temporary placing table 4 can be three-dimensionally measured. Subsequently, the robot 6B grips the component on the temporary placing table 4.

At this time, when the orientation of the component needs to be changed, the robot 6b once releases the component above the temporary placing table 4, and then re-grip the component from another side.

The control device 7B outputs sequence control instructions to the three-dimensional vision sensor 1 (depth map measuring means), the robot 3 (isolation means), and the robot 6B (position and orientation changing means) so that the series of operations is repeatedly performed.

Note that, here, the three-dimensional vision sensor 1 also has the function of the component profile measuring means. However, the two-dimensional vision sensor 5 described above may be provided as the component profile measuring means.

As described above, the component supply apparatus according to the fifth embodiment (FIG. 12) of the present invention includes the three-dimensional vision sensor 1 (depth map measuring means) for measuring a depth map, the bulk component box 2, the robot 3 (isolation means) for picking up a component from the bulk component box 2, the temporary placing table 4 onto which one or more of the components are rolled, the component profile measuring means (three-dimensional vision sensor 1) for measuring a profile of the component, and the robot 6B (position and orientation changing means) for picking up the component rolled on the temporary placing table 4 and changing a position and orientation of the component into a position and orientation that involve an error of a certain level or less with respect to a position and orientation that are specified in advance, while changing the position and orientation of the component.

The robot 3 (first robot) grips and picks up a component from the bulk component box 2, and the robot 6B (second robot) picks up the component rolled onto the temporary placing table 4 by the robot 3 so as to change a position and orientation of the component.

The temporary placing table 4 for placing thereon the one or more components gripped and rolled by the robot 3 functions partially as the isolation means.

The three-dimensional vision sensor 1 integrated with the robot 3 also functions as the component profile measuring means for measuring a profile of the component on the temporary placing table 4, and functions partially as the position and orientation changing means.

In this way, as in the above description, dedicated hands for the components need not be respectively prepared. As a result, it is possible to reduce costs of the hands, save time periods for designing the hands, and save a temporary placing space for the hands.

Further, switching in accordance with production models can be performed only by changing software, and hence switching in accordance with production models can be rapidly performed.

Still further, the robot 3 is provided integrally with the three-dimensional vision sensor 1 so as to form the hand-eye configuration. Thus, a tact time is increased, but sizes of the bulk component box 2 and the temporary placing table 4 can be set to be larger than the field of vision of the three-dimensional vision sensor 1.

Sixth Embodiment

Note that, in the fifth embodiment (FIG. 12) described above, the three-dimensional vision sensor 1 (depth map measuring means) is mounted only to the hand 3h of the robot 3. However, as in FIG. 13, a three-dimensional vision sensor 1C (depth map measuring means) may be mounted also to a hand 6h of the robot 6B, and the temporary placing table 4 may be omitted.

Figure 13:
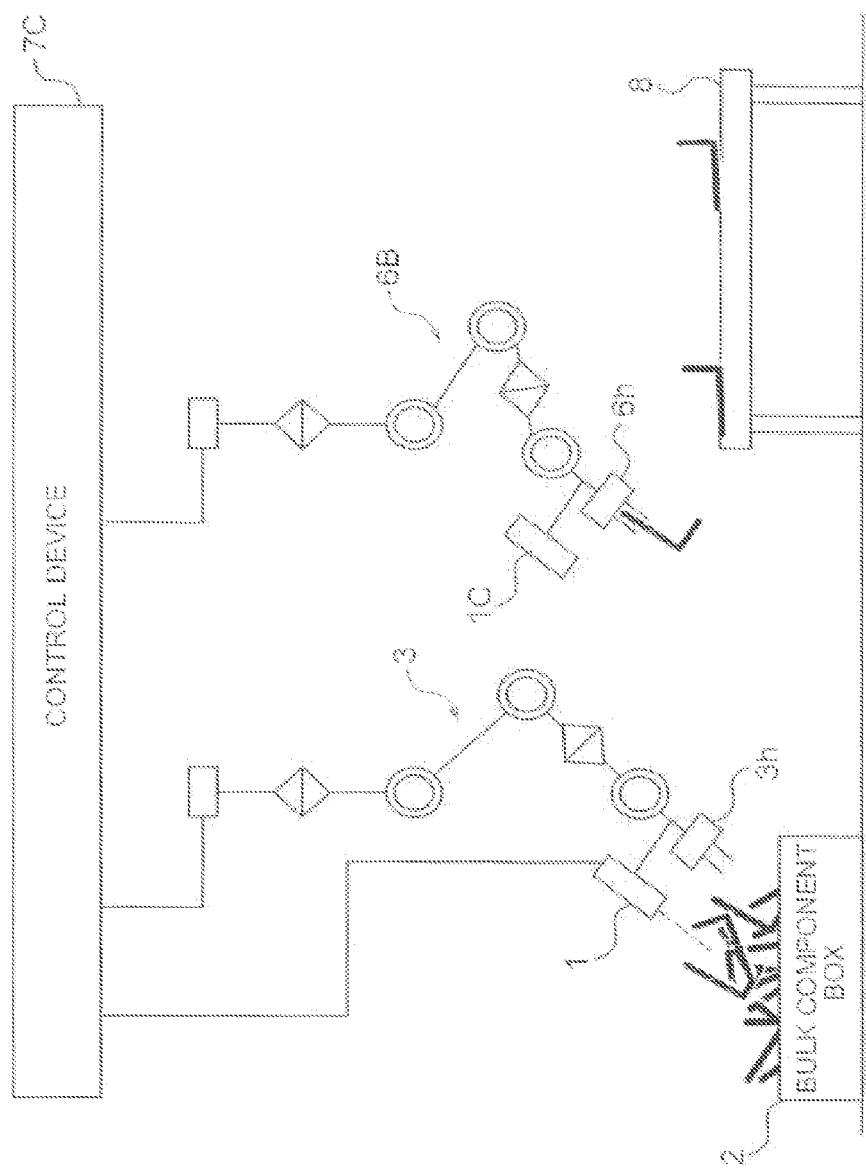
FIG. 13 is a schematic side view of an overall structure of a component supply apparatus according to a sixth embodiment of the present invention.

FIG. 13 is a schematic side view of an overall structure of a component supply apparatus according to a sixth embodiment of the present invention. In order to omit redundant description, the same components as those described above (refer to FIG. 12) are denoted by the identical reference symbols, or a suffix "C" is added to some of the same reference symbols.

This case is different from the cases described above in that the temporary placing table 4 is removed, and the three-dimensional vision sensor 1C is additionally provided to the robot 6B.

In FIG. 13, as in the above description, the three-dimensional vision sensors 1 and 1C each calculate a depth map (FIG. 2) of objects.

Specifically, the three-dimensional vision sensor 1 mounted to the robot 3 calculates candidates of parts that can be gripped by the robot 3 from among the stacked-up components based on results of analysis of the depth map. Then, through optimization, the candidates are targeted to one.

For example, when the hand 3h has the shape as illustrated in FIG. 3 or 4 as described above, the claws 3t are numerically modeled in advance as two columnar cylinders (or square columns) of a minimum size containing the respective claws opened at the opening width W. With this, two claw tips of the hand 3h can be inserted into a heap of the bulk components simultaneously with each other without coming into contact with the components.

Next, on a premise that a latest depth map is obtained, the latest depth map is searched for a location having spaces that may accommodate the columnar cylinders obtained through the numerical modeling, and having a component present between the spaces.

In the example of FIG. 2, two points, specifically, the part extending in a protruding manner near the center and the recessed parts on the front side are found.

Alternatively, template matching of shapes of small protruding parts that can be gripped by the robot hand, such as a square column, a columnar cylinder, a flat plate, and a disk that can be accommodated between the opened claws 3t of the hand 3h, is performed with respect to the depth map so as to search for and extract a plurality of candidates.

Next, an optimization calculation in which scores are given to the plurality of candidates and one with the highest score is selected, is performed. The score to be employed in this optimization method is the highest Z-axis value of the protrusion sandwiched between the two columnar cylinders, or the highest Z-axis value of the fine square column thus found, and a candidate having the highest score is selected. This optimization calculation corresponds to selection of the uppermost one of the bulk components. In other words, the optimization of the candidates of the components is performed through selection of the highest score. In the example of FIG. 2, the central protruding part corresponds to the optimized candidate.

How to apply the claws 3t of the hand 3h of the robot 3 to the optimized candidate so as to grip a component can be obtained through a simple calculation of converting a position and orientation of the robot 3 to X-, Y-, and Z-axis values and rotation angles about those axes of the robot coordinate system, and adding thereto a position and orientation relative to a position and orientation of the optimized candidate.

Note that, the template matching of fine square columnar parts of sizes sufficient for being picked up by the hand 3h is performed with respect to the depth map so as to extract a candidate point and perform optimization with use of a Z-axis height thereof. Also in this way, a gripping position and orientation can be calculated, and hence the same advantage can be obtained.

According to the robot coordinate calculation method, the robot 3 opens the claws 3t of the hand 3h with respect to the components bulked up in the bulk component box 2. In this state, the robot 3 moves the hand 3h to a gripping position that has been obtained at that time point, and closes the hand.

Subsequently, the robot 3 moves the hand 3h in the Z-axis direction so as to draw up the component that has been successfully gripped from the bulk component box 2. Then, the component thus picked up is transferred to the robot 6B.

At this time, the robot 6B measures the component gripped by the robot 3 with the three-dimensional vision sensor 1C (depth map measuring means) provided to the hand 6h. With this, a position and orientation of the component are recognized, and a gripping position is determined. Then, the robot 6B approaches the component, and grips the component.

Note that, the robot 3 may fail in the operation of taking out the component from the bulk component box 2, or a plurality of components may be entangled and picked up in a lump.

Those isolation fail states can be distinguished based on imaging results from the three-dimensional vision sensor 1C mounted to the robot 6B at the time of the operation of passing the component between the robot 3 and the robot 6B.

As described above, when the isolated state (preferred state in which only one component is picked up without being entangled) cannot be achieved, in other words, when the component fails to be taken out, the robot 3 brings the currently gripped component out of line, and performs the pick-up operation again.

In this way, at the time point when the component in the bulk component box 2 is successfully isolated, the robot 6B grips, with the hand 6h that is the parallel chuck hand, the component transferred from the robot 3, and arranges the component in alignment onto the pallet 8. Then, the series of operations is completed.

Here, along with a process of handling the component, description is made of the operation of the entire apparatus according to the sixth embodiment (FIG. 13) of the present invention.

First, the three-dimensional vision sensor 1 (depth map measuring means) of the robot 3 recognizes the components in the bulk component box 2, and positions and orientations of grippable parts (such as a part protruding like a lobe, or a part estimated to have such a shape) of the recognized components are targeted to one.

Subsequently, under control by a control device 7C, the robot 3 is operated so that the position and orientation of the grippable part and positions and orientations of the claws 3t of the hand 3h of the robot 3 match each other.

Then, the robot 3 closes the claws 3t to grip the component, and takes out the component from the bulk component box 2. Subsequently, the component is presented close to the robot 6B.

Next, the three-dimensional vision sensor 1C (depth map measuring means) of the robot 6B recognizes a position and orientation of the component thus presented.

At this time, when the orientation of the component needs to be changed, the robot 6B grips the component while performing a rotational operation of the hand 6h. When the orientation needs to be changed in a more complicated manner, the robot 6B once presents back the component to the robot 3 so that the component is received by the robot 3. Then, the robot 6B re-grips the component from another side.

The control device 7C outputs sequence control instructions to the robot 3 (isolation means), the robot 6B (position and orientation changing means), and the three-dimensional vision sensors 1 and 1C (depth map measuring means) so that the series of operations is repeatedly performed.

As described above, the component supply apparatus according to the sixth embodiment (FIG. 13) of the present invention includes the three-dimensional vision sensor 1 (depth map measuring means) for measuring a depth map, the bulk component box 2, the robot 3 (isolation means) for picking up a component from the bulk component box 2, the three-dimensional vision sensor 1C (depth map measuring means) that functions as the profile measuring means for the component gripped by the robot 3, and the robot 6B (position and orientation changing means) for re-gripping the component gripped by the robot 3 and changing a position and orientation of the component into a position and orientation that involve an error a certain level or less with respect to a position and orientation that are specified in advance, while changing the position and orientation of the component.

In this way, as in the above description, dedicated hands for the components need not be respectively prepared. As a result, it is possible to reduce costs of the hands, save time periods for designing the hands, and save a temporary placing space for the hands.

Further, switching in accordance with production models can be performed only by changing software, and hence switching in accordance with production models can be rapidly performed.

Still further, the robots 3 and 6B are provided integrally with the three-dimensional vision sensors 1 and 1C, respectively, so as to form the hand-eye configuration. Thus, a tact time is increased, but sizes of the bulk component box 2 and the pallet 8 can be set to be larger than the field of vision of each of the three-dimensional vision sensors 1 and 1C.

Seventh Embodiment

Note that, in the fifth and sixth embodiments (FIGS. 12 and 13), the robot 6B for passing a component from the robot 3 is provided. However, as in FIG. 14, the robot 6B may be omitted by providing a robot 3D including the three-dimensional vision sensor 1 and also having the function of the position and orientation changing means.

Figure 14:
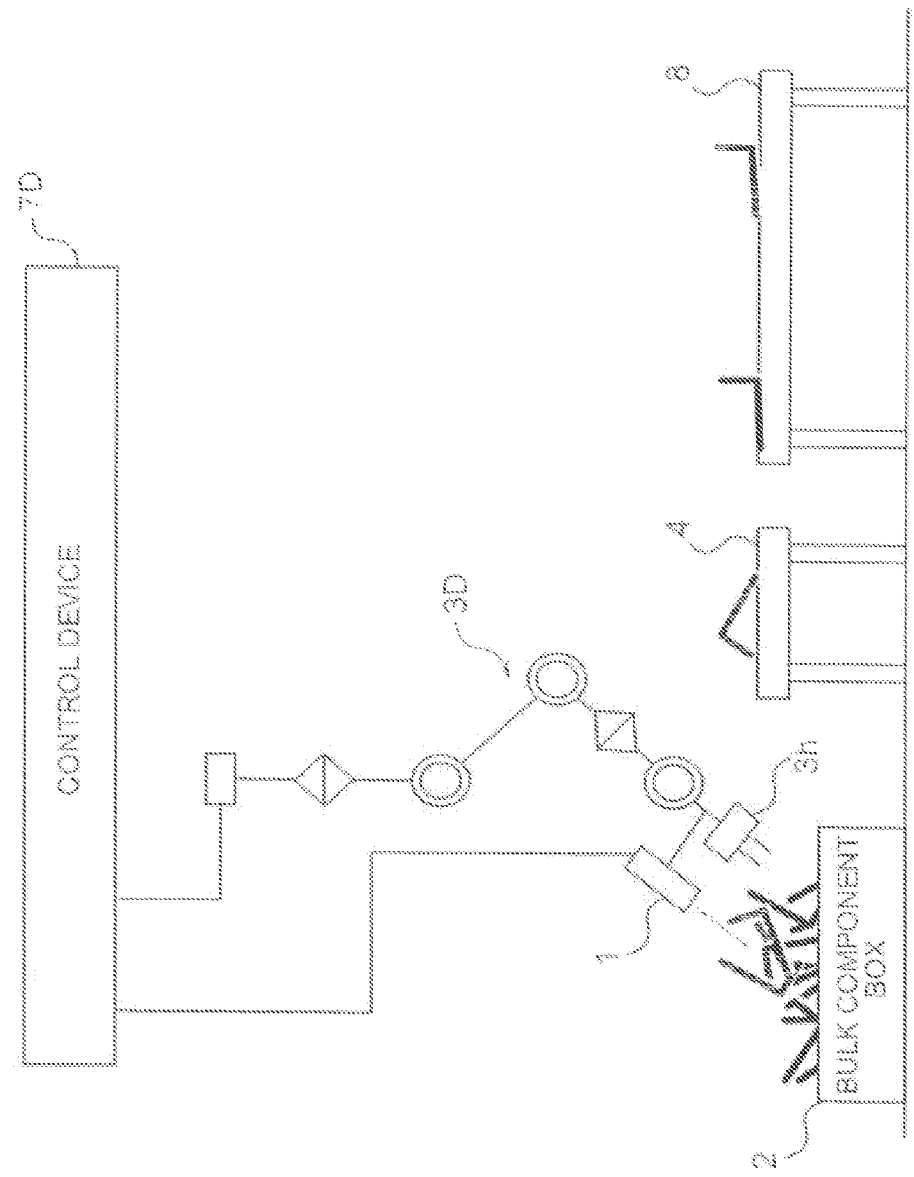
FIG. 14 is a schematic side view of an overall structure of a component supply apparatus according to a seventh embodiment of the present invention.

FIG. 14 is a schematic side view of an overall structure of a component supply apparatus according to a seventh embodiment of the present invention. In order to omit redundant description, the same components as those described above (refer to FIG. 12) are denoted by the identical reference symbols, or a suffix "D" is added to some of the same reference symbols.

This case is different from the cases described above only in that the robot 6B is removed. As in the above description, the robot 3D includes the hand 3h as in FIG. 3 or 4.

In FIG. 14, first, as in the above description, the three-dimensional vision sensor 1 cooperative with a control device 7D acquires a depth map (FIG. 2) of the bulk component box 2, and performs template matching. Then, the robot 3D is operated so that the claws 3t of the hand 3h of the robot 3D can be applied to an optimized candidate of grippable parts.

The robot 3D (isolation means) takes out only one component from among a large number of components received in the bulk component box 2. At this time, in order to increase the isolation success probability, a region in which, of the calibration error between the coordinate system of the three-dimensional vision sensor 1 and the coordinate system of the robot 3D, the orientation error is small is used.

The robot 3D carries the component gripped from the bulk component box 2 to the temporary placing table 4, and releases the component above the temporary placing table 4 in a throwing manner.

At this time, the robot 3D may fail to take out the component from the bulk component box 2. The plurality of components may be entangled and rolled in a lump onto the temporary placing table 4. Alternatively, the plurality of components may be rolled onto the temporary placing table 4 without being entangled.

Those states can be distinguished by imaging the temporary placing table 4 with the three-dimensional vision sensor 1 immediately after the robot 3D releases the gripping component.

When the robot 3D fails to take out the component, the robot 3D performs the pick-up operation again.

Further, when the plurality of components are entangled and rolled in a lump onto the temporary placing table 4, the components are brought out of line with, for example, means for inverting the top plate of the temporary placing table 4.

In addition, when the plurality of components are rolled onto the temporary placing table 4 without being entangled, the robot 3D handles the components one by one. However, after only one of the components is handled, residual components are brought out of line with, for example, the means for inverting the top plate of the temporary placing table 4.

At this time, the three-dimensional vision sensor 1 (depth map measuring means) cooperative with the control device 7D has the function of the component profile measuring means for acquiring profiles of the components rolled onto the temporary placing table 4 by imaging the same. According to the template matching method using the measured profiles, positions and orientations of the components on the temporary placing table 4 are calculated.

Subsequently, the robot 3D picks up a component from the temporary placing table 4, and arranges the component in alignment onto the pallet 8.

Here, along with a process of handling the component, description is made of the operation of the entire apparatus according to the seventh embodiment (FIG. 14) of the present invention.

First, the three-dimensional vision sensor 1 (depth map measuring means) recognizes components in the bulk component box 2, and targets grippable parts to one. Then, the robot 3D is operated so that a position and orientation of the grippable part and positions and orientations of the claws 3t (refer to FIGS. 3 and 4) of the hand 3h of the robot 3D match each other.

Subsequently, the robot 3D closes the claws 3t to grip the component, and takes out the component from the bulk component box 2. Then, the robot 3D opens the claws above the temporary placing table 4 so as to roll the component onto the temporary placing table 4. As a result, the component rests on the temporary placing table 4 in one of some patterns of stable states.

Here, for the sake of simplicity, description is made of a case where components are placed on the temporary placing table 4 in an isolated state without being entangled or overlapped.

Next, the three-dimensional vision sensor 1 recognizes a position and orientation of the component placed on the temporary placing table 4 according to the pattern matching method using the pick-up image on the temporary placing table 4 and the template images registered in advance.

In this way, the position and orientation of the component rolled on the upper surface of the temporary placing table 4 can be three-dimensionally measured. Then, the robot 3D grips the component on the temporary placing table 4. At this time, when the orientation of the component needs to be changed, the robot 3D once releases the component above the temporary placing table 4, and then re-grip the component from another side.

The control device 7D outputs sequence control instructions to the robot 3D (isolation means and position and orientation changing means) and the three-dimensional vision sensor 1 (depth map measuring means) so that the series of operations is repeatedly performed.

As described above, the component supply apparatus according to the seventh embodiment (FIG. 14) of the present invention includes the bulk component box 2 for receiving bulk components, the three-dimensional vision sensor 1 (depth map measuring means) for measuring a depth map of the components in the bulk component box, the robot 3D (isolation means) for picking up a component from the bulk component box 2 based on the depth map, and the position and orientation changing means (temporary placing table 4, robot 3D, three-dimensional vision sensor 1, and control device 7D) for changing a position and orientation of the component isolated by the robot 3D into a position and orientation that involve an error of a certain level or less with respect to a final position and orientation that are specified in advance, while changing, when necessary, the position and orientation of the component.

The isolation means and the position and orientation changing means include the single robot 3D that have both the functions of the isolation means and the position and orientation changing means.

The three-dimensional vision sensor 1 (depth map measuring means) is provided integrally with the robot 3D.

In this way, as in the above description, dedicated hands for the components need not be respectively prepared. As a result, it is possible to reduce costs of the hands, save time periods for designing the hands, and save a temporary placing space for the hands.

Further, switching in accordance with production models can be performed only by changing software, and hence switching in accordance with production models can be rapidly performed.

Eighth Embodiment

Note that, in the first embodiment described above, with regard to the operation in which the robot 3 approaches the bulk component box 2 so as to pick up a component, the Z-axis corresponding to the coordinate axis representing the orientation of the hand 3h of the robot 3 is fixed to the vertically downward direction of the world coordinate system or the direction of gravitational acceleration, but it suffices that the hand 3h is rotated in orientation about the Z-axis.

Specifically, in contrast to the first embodiment in which the vertical joint robot is used as the robot 3, in an eighth embodiment of the present invention, a SCARA type robot (horizontal articulated robot) or an orthogonal robot is used as the robot 3.

According to the eighth embodiment of the present invention, with use of the SCARA type robot or the orthogonal robot (not shown), the number of motors can be reduced with respect to that of the vertical robot. Thus, a system cost can be reduced.

Ninth Embodiment

Further, although not particularly referred to in the first to eighth embodiments described above, at the time of initially measuring a grippable component of the bulk components with the three-dimensional vision sensor, a plurality of three-dimensional vision sensors 1D may be used as in FIG. 18.

In the following, with reference to FIGS. 15 to 18, description is made of a ninth embodiment of the present invention, in which the plurality of three-dimensional vision sensors 1D are used.

Figure 15:
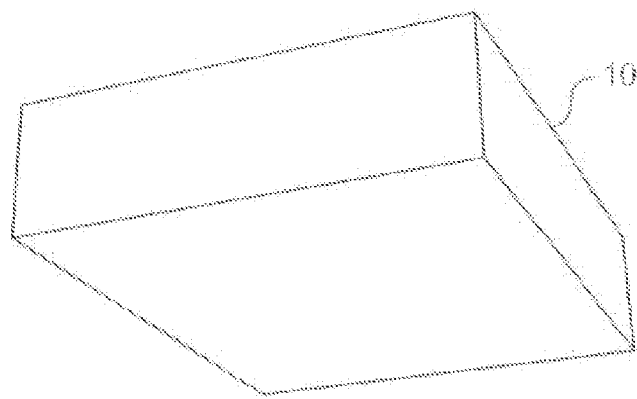
FIG. 15 is a perspective view of a three-dimensional shape of a component as a gripping object in a ninth embodiment of the present invention.
Figures 16A, 16B:
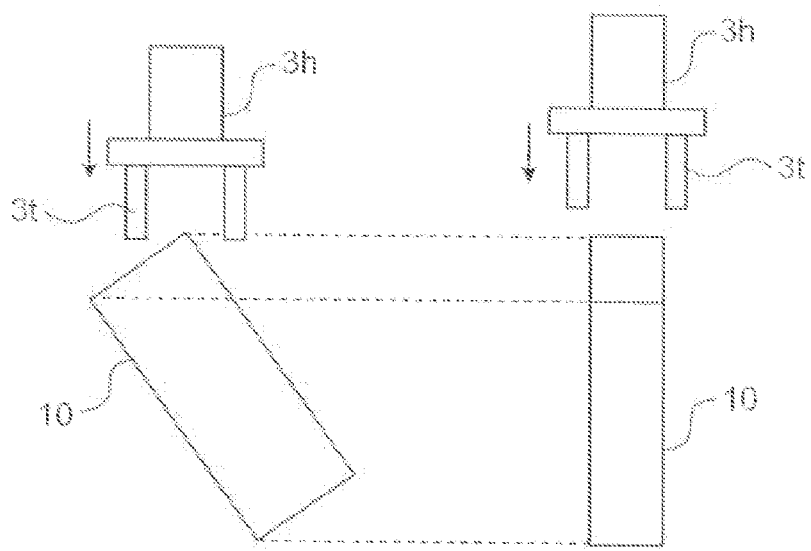
FIG. 16 are explanatory views represented by a side view and a front view of a component, which illustrate a problem to be solved by the ninth embodiment of the present invention.

FIG. 15 is a perspective view of a three-dimensional shape of a component 10 as a gripping object in the ninth embodiment of the present invention. FIGS. 16 and 17 are explanatory views illustrating a problem to be solved by the ninth embodiment of the present invention.

In FIG. 16, FIG. 16(*a*) is a side view of the component 10 as one of the bulk components, and FIG. 16(*b*) is a front view of the component 10. In FIG. 17, FIG. 17(*a*) is a side view of overlapped components 10a and 10b, and FIG. 17(*b*) is a side view of components 10c and 10d in a light blocking state.

Further, FIG. 18 are side views of the plurality of three-dimensional vision sensors 1D according to the ninth embodiment of the present invention, illustrating the components 10a to 10d correspondingly to those in the state of FIG. 17.

First, description is made of a gripping operation in a case where protruding parts (refer to FIG. 2) are observed by a three-dimensional vision sensor at the time when the components 10 each having a rectangular parallelepiped shape, which is illustrated in FIG. 15, are stacked into bulk in the bulk component box 2.

Even when the hand 3h is moved, for example, in a direction illustrated in FIG. 16(*a*) and the claws 3t are closed with respect to the component 10 in an inclined orientation as in FIG. 16, the component 10 slips away in the middle of closure of the claws 3t. In this way, the probability of gripping the component 10 is low.

In this case, as illustrated in FIG. 16(*b*), the claws 3t are required to be closed with respect to the component 10 oriented in the front direction. With this, the component 10 can be gripped with high probability.

Thus, it is appropriate to configure a recognition algorism of searching for and selecting a direction in which side surfaces perpendicularly extend straight as in FIG. 16(*b*), instead of gripping the component 10 in a direction in which side surfaces of a protruding part (corner portion) of the component 10 are inclined as in FIG. 16(*a*).

However, as illustrated in FIG. 17, when the components 10a and 10b in an overlapped state as illustrated in FIG. 17(*a*) are observed with a single three-dimensional vision sensor 1, the field of vision of the three-dimensional vision sensor 1 is blocked by the overlapped component 10a. In this case, depth data (depth map) within a range corresponding to the blocked sight cannot be obtained.

In the state of FIG. 17(*a*), when a blank region from which the depth data cannot be acquired is determined as a region in which the component 10a extends straight, and it is determined that a grippable part is present and the claws 3t of the hand 3h are lowered based on this determination, the component 10b out of sight and the claws 3t may collide against each other. In the worst case, the claws 3t may be damaged. Further, even when the claws 3t are not damaged immediately, abrasion and metal fatigue progress. As a result, the claws 3t may be damaged over time, which may lead to reduction in gripping probability.

In contrast, when the blank region from which the depth data cannot be acquired is determined as a region in which the another component 10b is hidden, for example, the component 10d, which is hidden by the another component 10c but includes easily-grippable straight extending parts as in FIG. 17(*b*), is overlooked.

As a countermeasure, in the ninth embodiment of the present invention, as illustrated in FIG. 18, the plurality of (for example, three) three-dimensional vision sensors 1D are used.

Depth data measured in the three-dimensional vision sensors 1D are transmitted to the control device 7, and merged into single spatial data. Alternatively, with respect to depth data measured in one of the three-dimensional vision sensors 1D, depth data measured in the other three-dimensional vision sensors 1D are transmitted and merged therewith.

In this way, respective blank regions for the three-dimensional vision sensors 1D are complemented with each other, with the result that the depth data merged as in FIG. 2 is obtained.

Subsequently, as in the first embodiment described above, following the operation of searching for a protruding part, for example, an operation of gripping the component 10d is performed. This procedure is applicable also to the other second, third, fifth, and seventh embodiments.

Note that, a coordinate system of each of the plurality of three-dimensional vision sensors 1D and the coordinate system of the robot 3 are calibrated in advance.

Further, instead of the three-dimensional vision sensors 1D, a single three-dimensional vision sensor may be mounted to the robot 3 as in the fourth and sixth embodiments described above. In this state, the single three-dimensional vision sensor is moved to a plurality of positions and stopped thereat, and a plurality of depth data items are measured at the stationary positions. Note that, the entire measurement time period is elongated.

According to the ninth embodiment (FIG. 18) of the present invention, through acquisition of a plurality of depth data items, components that can be gripped by the robot 3 with high probability and components that cannot be gripped thereby with high probability can be distinguished from each other from among the components 10 in the bulk component box 2.

Thus, the success rate of gripping the component 10*d* is increased, and the number of times of re-gripping can be reduced. As a result, there is an advantage of increasing a tact time of the entire system. Further, there is another advantage of avoiding system failure that may be caused by the collision between the component 10*b* and the claws 3*t*.

As described above, according to the first to ninth embodiments of the present invention, it is possible to provide an apparatus for aligning (or assembling) components supplied in bulk with use of the three-dimensional vision sensor 1. Thus, a component supply step essential to automated assembly apparatus, automated assembly robots, and the like can be innovated.

In particular, when the position and orientation changing means for components includes a robot, versatility of the robot can be secured by changing software in the control device and by changing hardware of the robot. Further, basically, the change of the hardware includes engineering of merely changing a size of the robot hand. With this, the hardware can be used for other purposes thereafter, and hence can be adapted to handling of various components. As a result, switching in accordance with production models can be rapidly performed, and costs for switching models can be reduced.

REFERENCE SIGNS LIST

1, 1C, 1D three-dimensional vision sensor, 2 bulk component box, 3, 3D, 6*a*, 6*b*, 6*c*, 6B robot, 3*h*, 6*h* hand, 3*t* claw, 4 temporary placing table, 5 two-dimensional vision sensor, 6 robot group, 7, 7A, 7B, 7C, 7D control device, 8 pallet, 10 component.

The invention claimed is:
1. A component supply apparatus, comprising:
a depth map measuring means for measuring a depth map of bulk components in a bulk component box for receiving the bulk components;
a first robot for gripping one or more components from the bulk component box based on the depth map and releasing the one or more components above a temporary placing table;
component profile measuring means for recognizing a position and orientation of the one or more components placed on the temporary placing table, recognizing when the one or more components placed on the temporary placing table includes a plurality of components, outputting an indication of whether the plurality of components are placed on the temporary placing table, outputting an indication of whether one of the one or more components placed on the temporary placing table includes a component of another type, and outputting pattern identification information indicating a matching of the position and orientation of at least one of the one or more components with at least one template image corresponding to a stable condition of the component;

removing means for removing one or more components from the temporary placing table in any one or more of the following cases
where the component profile measuring means outputs the indication that the plurality of components are placed on the temporary placing table,
where the component profile measuring means outputs the indication that the one or more components placed on the temporary placing table includes the component of the another type, and
where the component profile measuring means outputs the pattern identification information indicating the position and orientation of the at least one of the one or more components does not match with at least one of the template images corresponding to the stable condition of the component; and
a second robot comprised of a group of robots and configured so that, when the pattern identification information indicates a match with the template images, the robots in the group of robots pass one of the one or more components placed on the temporary placing table between them by a movement preset in accordance with the stable condition to align the component on a pallet so that the position and orientation of the component involves an error of a certain level or less with respect to a final position and orientation that are specified in advance.

2. The component supply apparatus according to claim 1, wherein the first robot is included in the plurality of second robots.

3. The component supply apparatus according to claim 1, further comprising a control device for controlling an operation and operation timing of the first robot and the second robot, and an operation and operation timing of a three-dimensional vision sensor and a two-dimensional vision sensor.

4. The component supply apparatus according to claim 1, wherein the first robot is further configured to cause the released one or more components to roll onto the temporary placing table in a throwing manner.

5. The component supply apparatus according to claim 1, wherein the removing means inverts the temporary placing table to cause the one or more components placed on the temporary placing table to be removed from the temporary placing table.

6. A component supply apparatus, comprising:
a first vision sensor that measures a depth map of bulk components in a bulk component box that stores the bulk components;
a first robot that grips one or more components from the bulk component box based on the depth map and releases the one or more components above a temporary placing table;
a second vision sensor that recognizes a position and orientation of the one or more components placed on the temporary placing table, recognizes when the one or more components placed on the temporary placing table includes more than one component, outputs an indication of whether the plurality of components are placed on the temporary placing table, outputs an indication of whether the one or more components placed on the temporary placing table includes a component of another type, and outputs pattern identification information indicating a matching of the position and orientation of at least one of the one or more components with at least one template image corresponding to a stable condition of the component;

a component removing apparatus that removes one or more components from the temporary placing table in any one or more of the following cases
where the second vision sensor outputs the indication that the temporary placing table includes more than one component,
where the second vision sensor outputs the indication that the one or more components includes the component of another type, and
where the second vision sensor outputs the pattern identification information indicating the position and orientation of the component does not match with at least one of the template images corresponding to a stable condition of the component; and
a second robot comprised of a group of robots and configured so that, when the pattern identification information indicates a match with the template images, the robots in the group of robots pass one of the one or more components placed on the temporary placing table between them by a movement preset in accordance with the stable condition to align the component on a pallet so that the position and orientation of the component involves an error of a certain level or less with respect to a final position and orientation that are specified in advance.

7. The component supply apparatus according to claim 6, wherein the first robot is further configured to cause the released one or more components to roll onto the temporary placing table in a throwing manner.

8. The component supply apparatus according to claim 6, wherein the component removing apparatus inverts the temporary placing table to remove the one or more components placed on the temporary placing table.

* * * * *